United States Patent
Mitzmacher

(10) Patent No.: US 7,252,270 B2
(45) Date of Patent: Aug. 7, 2007

(54) SYSTEM AND METHOD FOR LAUNCHING A MISSILE FROM A FLYING AIRCRAFT

(75) Inventor: Gil Mitzmacher, Rishon Le Zion (IL)

(73) Assignee: Israel Aircraft Industries, Ltd., Lod (IL)

( * ) Notice: Subject to any disclaimer, the term of this patent is extended or adjusted under 35 U.S.C. 154(b) by 288 days.

(21) Appl. No.: 10/910,584

(22) Filed: Aug. 4, 2004

(65) Prior Publication Data

US 2005/0116110 A1    Jun. 2, 2005

(30) Foreign Application Priority Data

Aug. 5, 2003  (IL) ........................ 157261
Jul. 13, 2004  (IL) ........................ 163002

(51) Int. Cl.
*B64G 1/36* (2006.01)

(52) U.S. Cl. .................. 244/171.3; 244/3.1; 244/63; 244/137.3; 244/171.4; 102/377; 89/1.8

(58) Field of Classification Search .............. 244/2, 244/171.3, 63, 137.3, 3.1, 171.4; 102/377; 89/1.8, 1.813, 1.819
See application file for complete search history.

(56) References Cited

U.S. PATENT DOCUMENTS

| | | | |
|---|---|---|---|
| 4,208,949 A | 6/1980 | Boilsen .................. | 89/1.801 |
| 4,283,988 A * | 8/1981 | Edwards .................. | 89/1.51 |
| 4,444,087 A | 4/1984 | Hunter et al. ............. | 89/1.802 |
| 4,489,638 A | 12/1984 | Bastian et al. ............. | 89/1.815 |
| 4,802,639 A | 2/1989 | Hardy et al. .............. | 244/2 |
| 4,901,949 A | 2/1990 | Elias ....................... | 244/49 |
| 4,923,148 A | 5/1990 | Fillingham et al. ...... | 244/137.1 |
| 5,050,477 A | 9/1991 | Cowdery et al. .......... | 89/1.802 |
| 5,141,175 A | 8/1992 | Harris ...................... | 244/3.25 |
| 5,333,528 A | 8/1994 | Klestadt et al. ........... | 89/1.51 |
| 5,339,742 A | 8/1994 | Hulderman et al. ....... | 102/387 |
| 5,363,737 A | 11/1994 | Wallis ...................... | 89/1.54 |

(Continued)

OTHER PUBLICATIONS

BU Terriers Satellite: Launch Facts, Apr. 8, 1999, Center for Space Physics, Networked Information Services, Office of Information Technology, Boston University, www.bu.edu/satelllite/launch/facts.html.

(Continued)

*Primary Examiner*—J. Woodrow Eldred
(74) *Attorney, Agent, or Firm*—Foley & Lardner LLP

(57) ABSTRACT

System for launching a missile from a launch region within the atmosphere of a planet, the missile being located within a flying vehicle before launching the missile, the system including a missile support coupled with the missile, and a foldable control-surface mechanism coupled with the missile support, the foldable control-surface mechanism being in a folded position before ejecting the missile support and the missile from the flying vehicle, the foldable control-surface mechanism moving from a folded position to an operational position after ejecting the missile support and the missile from the flying vehicle, wherein the foldable control-surface mechanism maneuvers the missile and the missile support to a predetermined orientation suitable for launching the missile, wherein the missile support is decoupled from the missile when the missile and the missile support are at the predetermined orientation, and wherein the missile is launched after reaching the predetermined orientation.

71 Claims, 20 Drawing Sheets

U.S. PATENT DOCUMENTS

| | | | |
|---|---|---|---|
| 5,564,648 A | 10/1996 | Palmer | 244/2 |
| 5,763,811 A | 6/1998 | Ruzicka | 89/1.51 |
| 5,853,143 A * | 12/1998 | Bradley et al. | 244/3.21 |
| 5,880,396 A | 3/1999 | Zacharias | 102/384 |
| 6,029,928 A | 2/2000 | Kelly | 244/2 |
| 6,068,211 A | 5/2000 | Toliver et al. | 244/2 |
| 6,144,899 A | 11/2000 | Babb et al. | 701/3 |
| 6,260,802 B1 | 7/2001 | Hampsten | 244/137.1 |
| 6,347,567 B1 | 2/2002 | Eckstein | 89/1.59 |
| 6,354,182 B1 | 3/2002 | Milanovich | 89/1.818 |
| 6,400,139 B1 | 6/2002 | Khalfin et al. | 324/207.17 |
| 6,474,592 B1 | 11/2002 | Shnaps | 244/3.15 |
| 6,474,600 B1 | 11/2002 | Apps | 244/137.1 |
| 6,508,435 B1 | 1/2003 | Karpov et al. | 244/2 |
| 6,534,982 B1 | 3/2003 | Jakab | 324/318 |
| 6,543,715 B1 * | 4/2003 | Karpov et al. | 244/2 |
| 2003/0080241 A1 * | 5/2003 | Shpigler et al. | 244/2 |

OTHER PUBLICATIONS

Determining Center of Pressure—cp (simplified), NASA Glenn Research Center, Tom Benson, www.grc.nasa.gov/WWW/K-12/airplane/rkcp.html.

A&AE 251, Introduction to Aerospace Design, Spring 1999, http://aae.www.ecn.purdue.edu/~aae251/project/spring99-rfp.html.

Rocketplane System—Operations Concept, www.rocketplane.com/OpsConcept.html.

A Study of Air Launch Methods for RLVs, American Institute of Aeronautics and Astronautics, AIAA 2001-4619, Marti Sarigul-Klijn, Ph.D. and Nestrin Sarigul-Klijn, Ph.D., Mechanical and Aeronautical Engineering Dept., University of California, Davis, CA 95616.

* cited by examiner

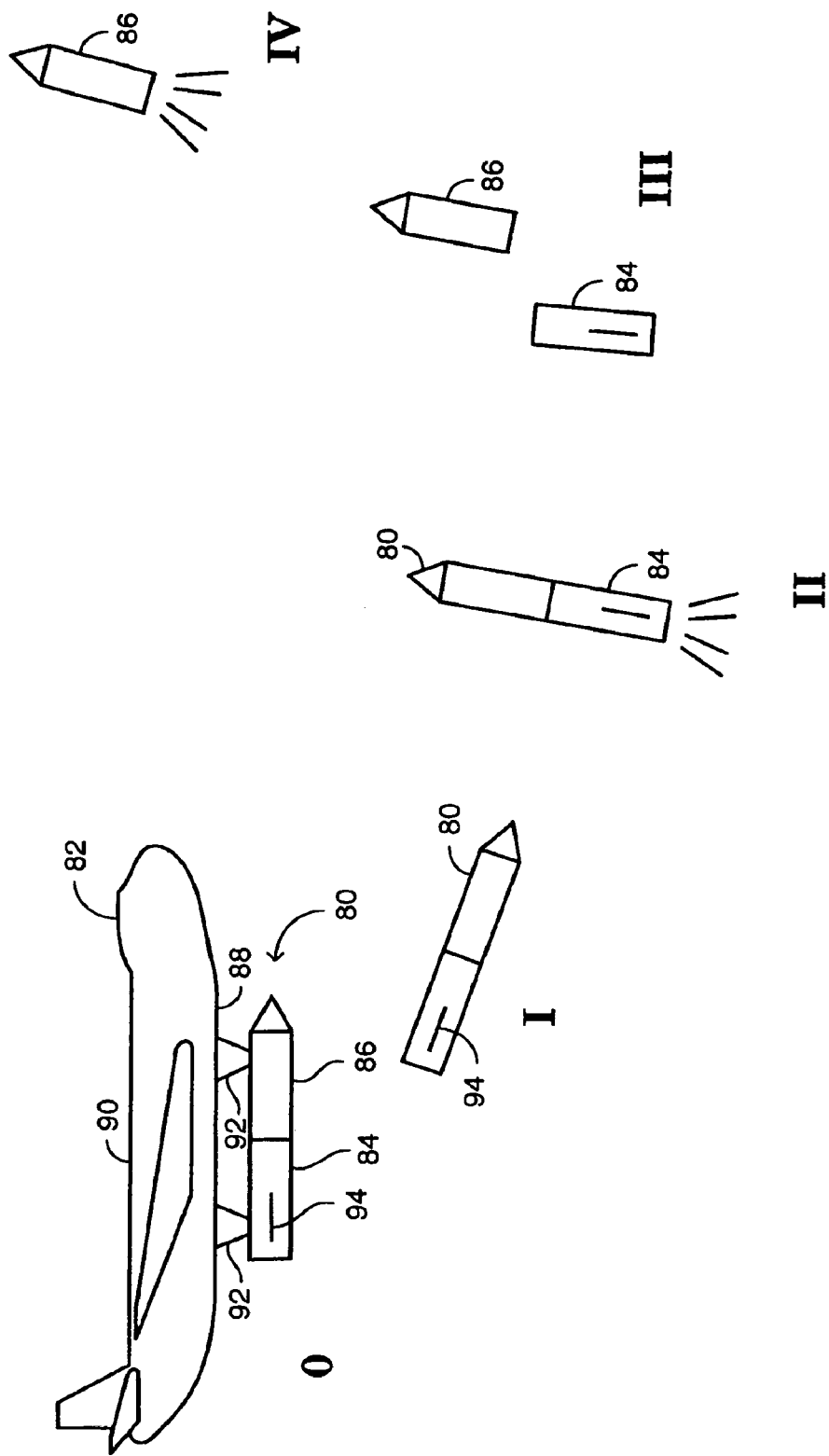

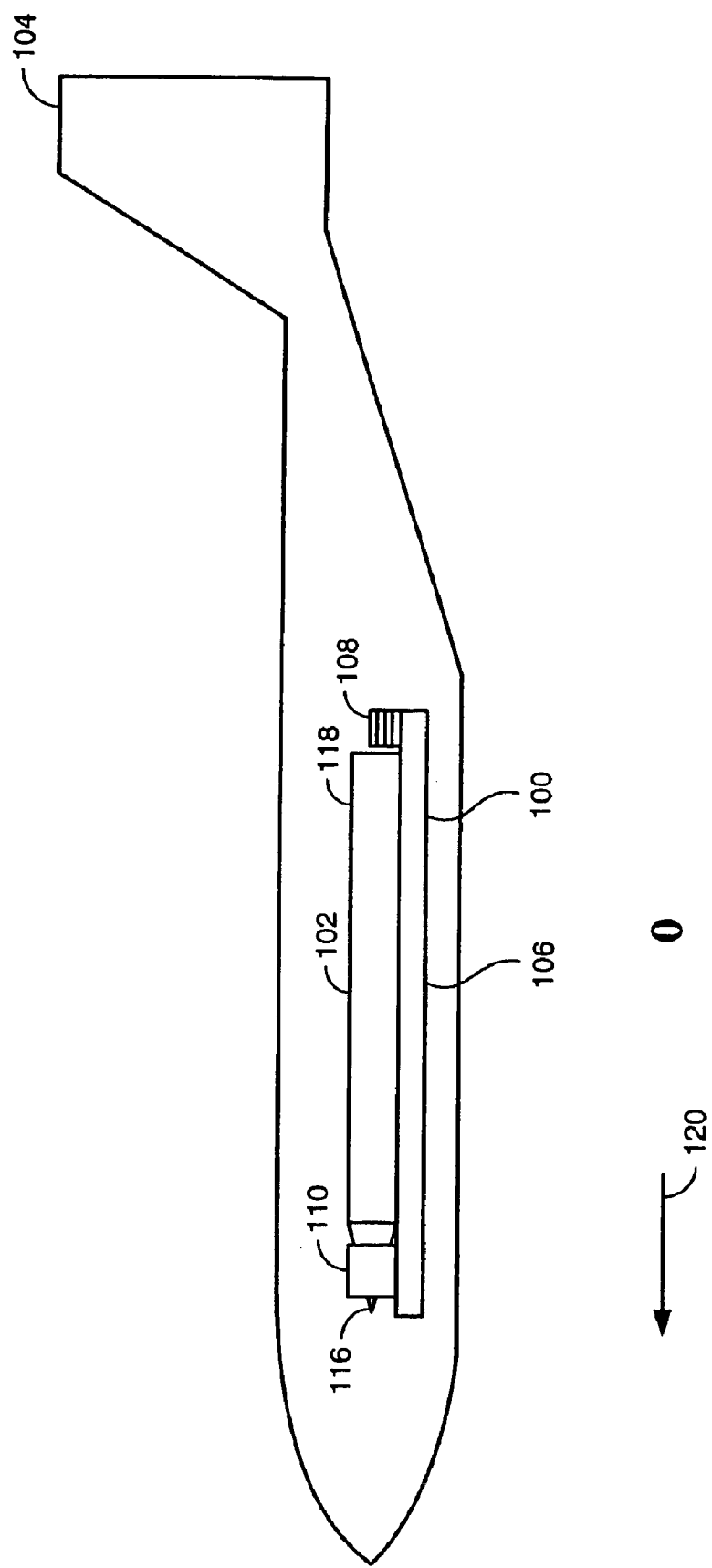

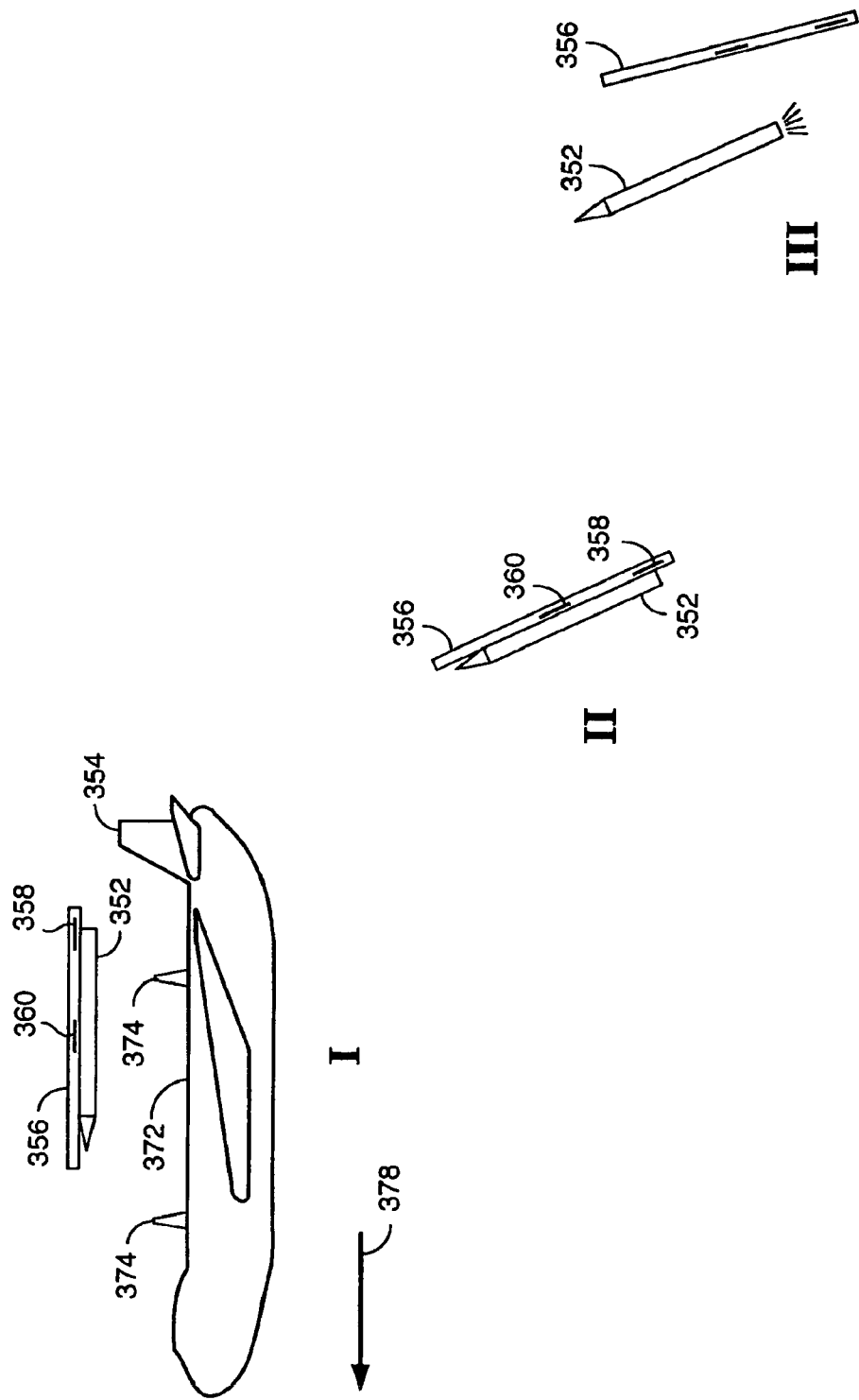

SYSTEM AND METHOD FOR LAUNCHING A MISSILE FROM A FLYING AIRCRAFT

FIELD OF THE DISCLOSED TECHNIQUE

The disclosed technique relates to flying vehicles in general, and to methods and systems for launching a missile, in particular.

BACKGROUND OF THE DISCLOSED TECHNIQUE

A spacecraft such as a satellite, spaceship, and the like, can be placed in orbit around the Earth with the aid of a launch vehicle. The launch vehicle can be launched either from a fixed launch pad, a floating launch pad or from a flying aircraft (i.e., air-launched). When it is required to place the spacecraft in a specific orbital plane relative to the stars, the opportunity to launch is limited to a very short period (i.e., launch window). Launching a launch vehicle from a fixed launch pad within the launch window depends on a number of factors, such as the time required to prepare the launch pad, assembling the launch vehicle on the launch pad, placing the spacecraft on the launch vehicle, loading the propellant into the launch vehicle, verifying proper operation of the systems and performing the launch.

The minimum orbital inclination which can be achieved from a fixed launch pad is rather restricted and depends on the geographic latitude at which the fixed launch pad is located. On the other hand maintaining a launch crew on site and repeatedly performing the pre-launch operations, increases the cost of the launch significantly.

Launching a launch vehicle from an aircraft overcomes most of the difficulties mentioned herein above. For example, by flying the aircraft together with the launch vehicle at a suitable latitude and speed, the chances of missing the launch window are significantly reduced. In this case, the launch window is limited only to the time which the aircraft can remain airborne. Furthermore, the minimum orbital inclination is not as restricted as in the case of fixed launch pads, and highly inclined orbits can be achieved.

Since the launch vehicle is launched from an altitude much higher than in the case of a fixed launch pad, less potential energy has to be added to the launch vehicle, less fuel has to be carried by the launch vehicle and thus a heavier payload can be placed into orbit. The launch location can be selected so that no inhabited land mass is jeopardized in launching the launch vehicle. Employing an aircraft to launch a launch vehicle is equivalent to having one launch pad which can be easily moved to any desired geographical location. Methods and systems for launching a launch vehicle from an aircraft are known in the art.

U.S. Pat. No. 6,474,600 issued to Apps and entitled "Aircraft Fuselage Having a Rear-End Opening for Cargo Dispatch", is directed to a fuselage of an aircraft having a rear end and a cargo carrying compartment, the aircraft carrying a cargo and dispatching the cargo in mid-air. The rear end of the fuselage includes a plurality of frames, a keel beam, a rear pressure bulkhead, two aft openings, a set of upper rails and a set of side rails. The rear pressure bulkhead includes two fore openings and a first set of doors. Each of the two fore openings includes a seal. The two aft openings are located at the underside of the fuselage. The two aft doors are closable by means of a second set of doors.

The rear pressure bulkhead separates the rear end of the fuselage from the cargo carrying compartment of the aircraft. The cargo carrying compartment is pressurized. When the first set of doors are in closed position, the pressure in the cargo carrying compartment presses the first set of doors against the seals to seal the cargo carrying compartment against the rear end of the fuselage. Each set of the upper rails and the set of the side rails are located on each side of the keel beam. The set of the upper rails and set of the side rails extend between the cargo carrying compartment and the two aft openings.

The set of upper rails and the set of side rails support and guide the respective items of a cargo. The set of the upper rails and the set of the side rails are inclined downwards at an angle to the straight and level flight path of the aircraft, in order to allow the items of the cargo to travel downward under gravity away from the rear pressure bulkhead, to be dispatched through the two aft openings. The cargo has a relatively small transverse dimension compared to the length thereof. The two fore openings provide passageway for the cargo. The item of the cargo depends from the relevant set of upper rails as the item moves toward the associated set of the aft openings. The associated set of side rails provides sideways support for the item as the cargo travels rearward.

The two fore openings provide unobstructed access to the cargo carrying compartment from outside the rear pressure bulkhead. The cargo is loaded in the cargo carrying compartment through an elongate opening near the front of the fuselage. The aircraft flies at a normal cruising altitude to a zone where the cargo is to be dispatched. The aircraft descends to an altitude at which the fuselage can be depressurized. One or both of the first set of doors are raised into an open position and the item of the cargo is lifted and conveyed from the cargo carrying compartment to the set of the upper rails and the set of the side rails. The second set of doors are opened and the item of the cargo is moved along the set of the upper rails and the set of the side rails, and the item of the cargo is dispatched.

U.S. Pat. No. 5,279,199 issued to August and entitled "Technique and Apparatus for Rearward Launch of a Missile", is directed to a method for launching a missile from an aircraft. The aircraft includes a missile launch tube located under a wing thereof. The missile is located within the missile launch tube. The forward end of the missile launch tube is closed and external portion thereof aerodynamically formed. The rear end of the missile launch tube is sealed with a break-away membrane. An air bag is located between the nose of the missile and the forward end of the missile launch tube. A missile nose bra is positioned within the air bag over the nose of the missile.

To initiate the launch of the missile, the air bag is inflated and a breaker device is activated to break the break-away membrane. The expansion force of the air bag shoots the missile out of the missile launch tube, in a direction opposite to the flying direction of the aircraft. Engagement of the missile nose bra with the missile, ensures that the longitudinal axis of the missile will match the longitudinal axis of the missile launch tube upon expulsion from the missile launch tube.

U.S. Pat. No. 6,508,435 issued to Karpov et al., and entitled "Method for Controlling an Aerospace System to Put a Payload into an Orbit", is directed to a method for putting a payload in an orbit. A carrier aircraft with a launch vehicle on board, takes off form a base aerodrome. The launch vehicle includes a payload. When the carrier aircraft reaches the launch area, it switches to the maximum cruising speed mode. The aircraft carrier begins a pitch-down maneuver and the flight speed increases to the maximum permissible horizontal speed. At this point the carrier aircraft switches to the pitch-up mode to fly at the maximum permissible angle of attack, where a near zero g-load acts on the carrier aircraft. At a preset time when the design flight speed, the design flight altitude, the design trajectory pitch angle and the near zero g-load conditions are satisfied, the launch vehicle is separated from the carrier aircraft with a predetermined speed of lagging relative to the carrier aircraft.

When the launch vehicle separates from the carrier aircraft and is located at a predetermined safe distance, the launch vehicle executes a pitch-around maneuver, until the optimum pitch angle is reached to launch the launch vehicle with the payload to a scheduled point of trajectory flight. When the optimum pitch angle differs from the vertical by 10 degrees and 30 seconds, active flight of the launch vehicle first stage is effected, followed by the separation of the launch vehicle first stage. Then the fairing separation, final stage burn-out and separation of the payload from the launch vehicle are effected.

When the launch vehicle is ejected from the carrier aircraft, the carrier aircraft flies toward the landing aerodrome. In case the separation of the launch vehicle from the carrier aircraft is aborted, the carrier aircraft together with the launch vehicle and the payload flies toward the landing aerodrome. In order to ensure the safety of the carrier aircraft and the crew members thereof, the launch vehicle propellant and the payload propellant are jettisoned overboard and the carrier aircraft lands with empty launch vehicle tanks and empty payload tanks.

U.S. Pat. No. 4,901,949 issued to Elias and entitled "Rocket-Powered, Air-Deployed, Lift-Assisted Booster Vehicle for Orbital, Suborbital and Suborbital Flight" is directed to a rocket vehicle which is air-launched from a carrier aircraft. The rocket vehicle includes a first stage, a second stage, a third stage, an aerodynamic wing, a plurality of fins, a plurality of fin actuators and an aft skirt. The first stage includes a first stage rocket motor, a first stage nozzle and a first stage casing. The second stage includes a second stage rocket motor, a second stage nozzle and a second stage casing. The third stage includes a third stage rocket motor, a third stage nozzle, a third stage casing and a payload. The aft skirt is secured to the first stage casing.

The first stage and the second stage are joined by a first adaptor. The second stage and the third stage are joined by a second adaptor. The aerodynamic wing is secured to the first stage casing. The fin actuators are located in the aft skirt. The fins are mechanically and pivotally supported by the fin actuators. The rocket vehicle is mounted to the carrier aircraft via an underwing launch pylon and a release mechanism.

The carrier aircraft takes off from a conventional runway. When reaching a launch point, the rocket vehicle is air-launched from the carrier aircraft at subsonic velocities in a substantially horizontal attitude and the rocket vehicle performs a free-fall maneuver. The first stage motor ignites and the fins are placed in a configuration which produces a pitch-up attitude of the rocket vehicle. In this manner, the rocket vehicle performs a vertical-S maneuver and climbs at an angle of ascent which is less than 45 degrees. The fins are placed in a configuration to cause the rocket vehicle to pitch-down, thereby decreasing the ascent flight path thereof and reaching a push-over point. The push-over point is related to an optimum attitude and velocity of the rocket vehicle. The first stage, the aerodynamic wing, and the fins are jettisoned and burn up in the atmosphere on reentry. Likewise the second stage ignites and is jettisoned and the third stage ignites and is jettisoned.

U.S. Pat. No. 5,363,737 issued to Wallis and entitled "Air-Vehicle Launcher Apparatus", is directed to a system for launching a missile from an aircraft. The system includes a launcher, an adaptor, a series of attachment hooks and a plurality of releasable straps. The missile includes a plurality of deployable fins. The adaptor includes an empennage, a deployable parachute and jettison means.

The launcher is attached to the underside of the aircraft. The adaptor is attached to the launcher by the attachment hooks. The deployable parachute and the jettison means are stowed inside the adaptor. The missile is connected to the adaptor by the releasable straps. When the adaptor and the missile separate from the aircraft, the missile together with the adaptor adopts a pitch-down attitude while the empennage deploys. The deployable fins and the deployable parachute begin to deploy. The empennage and the deployable parachute stabilize the flight of the missile, while the deployable fins extend to lock-out positions. The adaptor and the missile are separated by the action of the jettison means and with the aid of the deployable parachute, and the missile continues flying toward a target.

Reference is now made to FIGS. 1A, 1B, 1C and 1D. FIG. 1A is a schematic illustration of a system generally referenced 50, for air-launching a missile generally referenced 52, as known in the art, the system and the missile being carried inside an aircraft generally referenced 54. FIG. 1B is a schematic illustration of the stages in air-launching the missile of FIG. 1A. FIG. 1C is a schematic illustration of a bottom view (view A) of the system of FIG. 1B in perspective, during the transition from stage II to stage II. FIG. 1D is a schematic illustration of a top view (view B) of the system of FIG. 1B in perspective, at stage III. The air-launch stage of missile 52 as illustrated in FIG. 1A, is known in the art as the zero stage (i.e., the stage in which aircraft 54 carries missile 52 to a region suitable for launching missile 52).

With reference to FIG. 1A, system 50 includes a platform 56, one or more ejection parachutes 58, four maneuvering parachutes 60, a plurality of cables 62 and a detachable ring 64. Missile 52 includes a fore section 66 and an aft section 68. Detachable ring 64 (FIG. 1C) is connected to a bottom lateral side of platform 56. Ejection parachutes 58 is connected to an end (not shown) of platform 56, in the vicinity of fore section 66. One end of cables 62 is connected to bottom four corners (not shown) of platform 56, and the other end thereof is connected to maneuvering parachutes 60. Cables 62 pass through detachable ring 64.

Aircraft 54 is flying in a direction designated by an arrow 70 relative to a global coordinate system. System 50 and missile 52 are located within aircraft 54, such that the direction from aft section 68 to fore section 66 is opposite to the direction of arrow 70. Ejection parachutes 58 and maneuvering parachutes 60 in FIG. 1A are shown in a packed condition.

With reference to FIG. 1B, in stage I, ejection parachutes 58 is deployed, thereby pulling platform 56 and missile 52 out of aircraft 54, in a direction designated by an arrow 72 relative to aircraft 54. In stage II platform 56 and missile 52 drop in the air, while maneuvering parachutes 60 are deployed. This configuration of platform 56 and missile 52 in which platform 56 is located below missile 52 is unstable. Therefore, platform 56 and missile 52 have a tendency to roll about a longitudinal axis 74 (FIG. 1C) of platform 56, to transform to a configuration in which platform 56 is located on the top of missile 52.

With reference to FIG. 1C, maneuvering parachutes 60 apply a force to a lateral side of platform 56, at the joint between detachable ring 64 and platform 56. The product of this force and the distance between detachable ring 64 and longitudinal axis 74, produces a moment which rotates platform 56 and missile 52 about longitudinal axis 74, in a direction referenced by an arrow 76. Thus, the force of maneuvering parachutes 60 aids in performing the rolling motion about longitudinal axis 74.

In stage III (FIGS. 1B and 1D) detachable ring 64 is disconnected from platform 56, wherein maneuvering parachutes 60 apply a uniform force on platform 56 through the four corners of platform 56. This uniform force moves platform 56 and missile 52 to an orientation suitable for launching missile 52 (stage IV). In stage V platform 56 separates from missile 52 and a rocket motor (not shown) of missile 52 is ignited, thereby launching missile 52. Platform 56 falls to the ground or to the ocean in reduced speed, with the aid of maneuvering parachutes 60.

Reference is now made to FIG. 1E, which is a schematic illustration of air-launching a missile generally referenced 80, from a flying aircraft generally referenced 82, as known in the art. Missile 80 includes a first stage 84, a second stage 86 and a payload (not shown). Missile 80 is connected to a bottom section 88 of a fuselage 90 of aircraft 82 by a plurality of pylons 92. Each of pylons 92 includes a disengagement mechanism (not shown) to decouple missile 80 from aircraft 82. First stage 84 includes a plurality of fins 94.

In stage zero, when aircraft 82 reaches the launch site, the disengagement mechanisms are activated, thereby decoupling missile 80 from aircraft 82. In stage I fins 94 are operated in order to maneuver missile 80 to a launch orientation designated as stage II. In stage II, first stage 84 is ignited thereby launching missile 80. In stage III, first stage 84 is decoupled from second stage 86, and in stage IV second stage 86 is ignited.

SUMMARY OF THE DISCLOSED TECHNIQUE

It is an object of the disclosed technique to provide a novel method and system for launching a missile from a flying vehicle.

In accordance with the disclosed technique, there is thus provided a system for launching a missile from a launch region within the atmosphere of a planet, wherein the missile is located within a flying vehicle before launching the missile. The system includes a missile support coupled with the missile, and a foldable control-surface mechanism coupled with the missile support.

The foldable control-surface mechanism is in a folded position before ejecting the missile support and the missile from the flying vehicle. The foldable control-surface mechanism moves from a folded position to an operational position after ejecting the missile support and the missile from the flying vehicle. The foldable control-surface mechanism maneuvers the missile and the missile support to a predetermined orientation suitable for launching the missile. The missile support is decoupled from the missile when the missile and the missile support are at the predetermined orientation. The missile is launched after reaching the predetermined orientation.

In accordance with another aspect of the disclosed technique, there is thus provided a method for launching a missile from a launch region within the atmosphere of a planet, wherein the missile is located within a flying vehicle before launching the missile. The method includes the procedures of ejecting the missile and a missile support from inside of the flying vehicle, and moving a control-surface mechanism from a folded position to an operational position.

The method further includes the procedures of rolling the missile support about a longitudinal axis of the missile support, and maneuvering the missile support and the missile, by the control-surface mechanism, to a predetermined orientation suitable for launching the missile. The method further includes the procedures of uncoupling the missile from the missile support and launching the missile. The missile is coupled with the missile support, and the control-surface mechanism is coupled with the missile support.

In accordance with a further aspect of the disclosed technique, there is thus provided a system for launching a missile from a launch region within the atmosphere of a planet, wherein the missile is carried to the launch region by a flying vehicle while the missile is coupled externally with the flying vehicle. The system includes a missile support coupled with the missile and with the flying vehicle, and a control-surface mechanism coupled with the missile support. The missile support and the missile are located outside of the flying vehicle, and the missile support is decoupled from the flying vehicle when the flying vehicle is at the launch region. The control-surface mechanism maneuvers the missile and the missile support to a predetermined orientation suitable for launching the missile. The is missile support is decoupled from the missile when the missile is at the predetermined orientation, and the missile is launched after reaching the predetermined orientation.

In accordance with another aspect of the disclosed technique, there is thus provided a method for launching a missile from a launch region within the atmosphere of a planet, wherein the missile is carried to the launch region by a flying vehicle while the missile is coupled externally with the flying vehicle. The method includes the procedures of decoupling a missile support from the flying vehicle while the flying vehicle is flying toward the launch region, maneuvering the missile support and the missile, by a control-surface mechanism coupled with the missile support to a predetermined orientation suitable for launching the missile, decoupling the missile from the missile support, and launching the missile. The missile support couples the missile with the flying vehicle while the flying vehicle is flying toward the launch region.

BRIEF DESCRIPTION OF THE DRAWINGS

The disclosed technique will be understood and appreciated more fully from the following detailed description taken in conjunction with the drawings in which:

FIG. 1E is a schematic illustration of air-launching a missile from a flying aircraft, as known in the art;

FIG. 2A is a schematic illustration of a system for launching a missile, constructed and operative according to an embodiment of the disclosed technique, the system and the missile being carried inside a flying vehicle;

FIG. 7B is a schematic illustration of different stages in launching the missile of FIG. 7A;

DETAILED DESCRIPTION OF THE EMBODIMENTS

The disclosed technique overcomes the disadvantages of the prior art by providing a novel missile platform, having fins coupled therewith, which is capable of maneuvering to an orientation suitable for launching the missile attached thereto. The fins may be foldable either within or outside of the platform when the platform and the missile are carried within the aircraft, and move to an operational position when the platform and the missile are ejected from the aircraft. The missile and the platform are ejected from the aircraft with the missile fore section being closer to the aircraft fore section than the missile aft section. Alternatively, the missile and the platform are ejected from the aircraft with the missile aft section being closer to the aircraft fore section than the missile fore section.

The term "atmosphere" herein below, refers to an altitude at which a flying vehicle, such as the missile support, can be aerodynamically maneuvered. The term "disengagement mechanism" herein below, refers to a mechanism for decoupling the missile support and the missile from the aircraft. The term "release mechanism" herein below, refers to a mechanism for decoupling the missile from the missile support. The term "control surface" herein below, refers to an airfoil such as aileron, elevator, canard, and the like, for maneuvering the flying vehicle (i.e., the missile support), in the atmosphere. The control surface can be either an aerodynamic surface having an aerodynamic profile which provides a lift, or a substantially flat plate. The term "positioning actuator" herein below, refers to an actuator which moves the control surface from a folded position to an operational position. The term "maneuvering actuator" herein below, refers to an actuator which moves the control surface in order to maneuver the missile support toward the launch orientation.

Figure 1A:
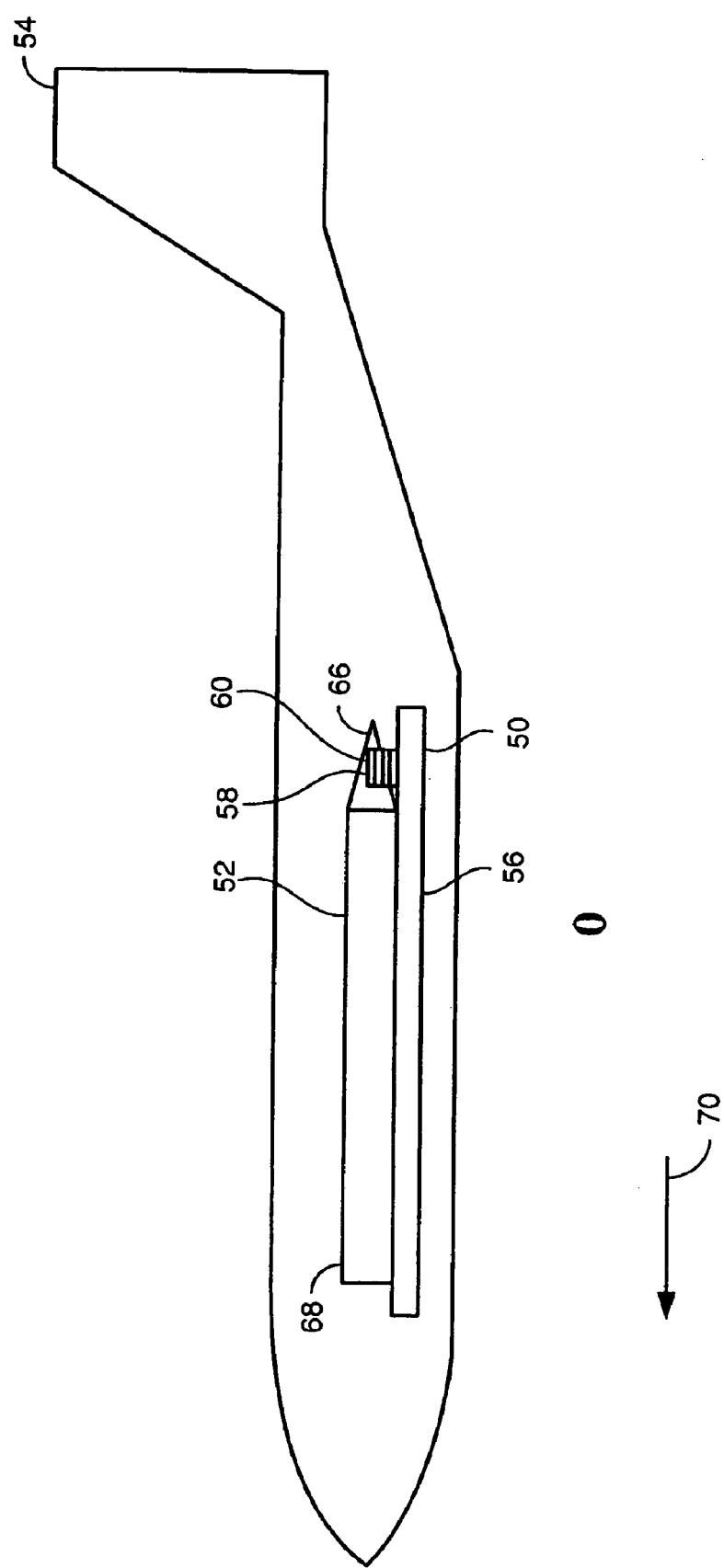
FIG. 1A is a schematic illustration of a system for air-launching a missile as known in the art, the system and the missile being carried inside an aircraft.
Figure 1B:
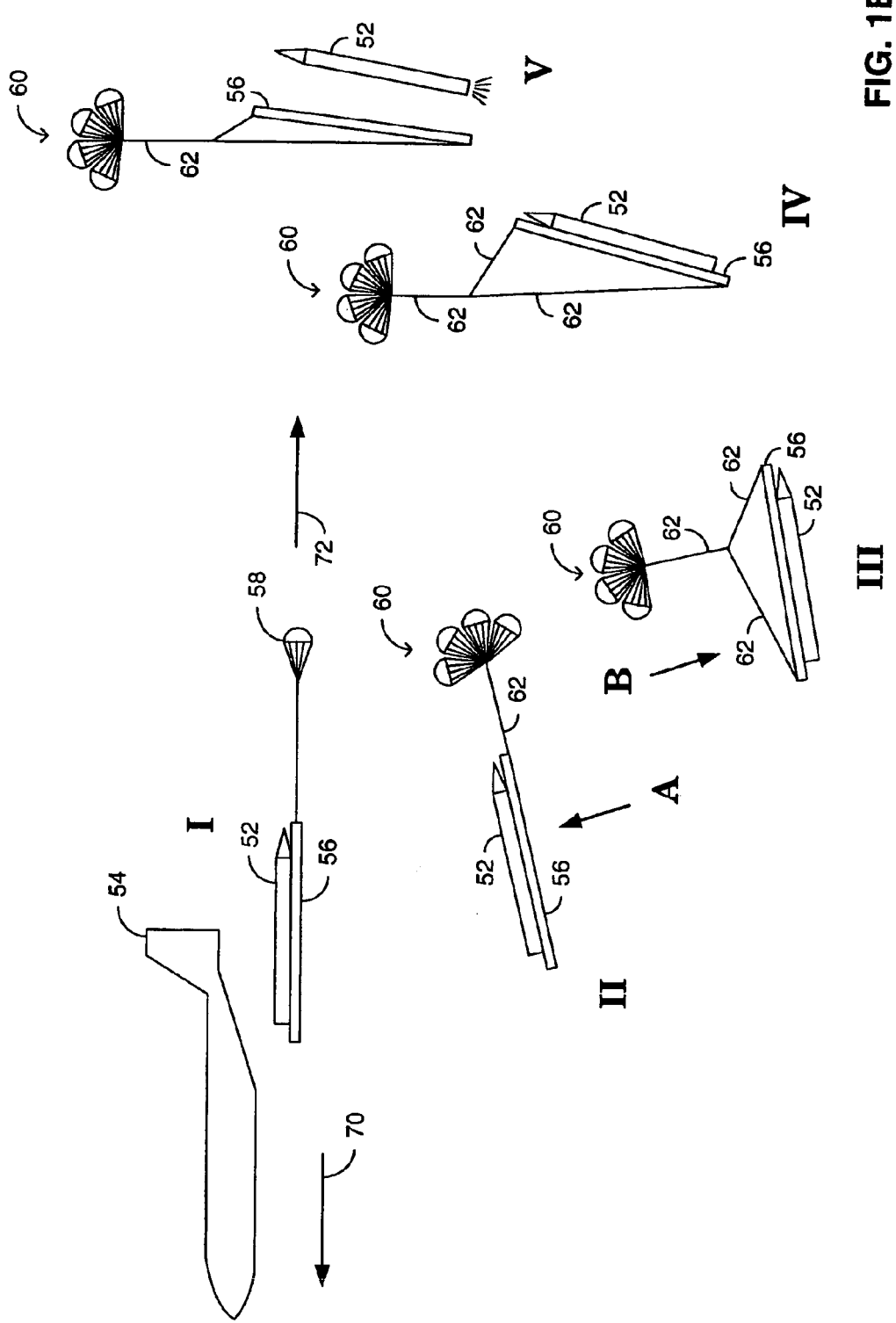
FIG. 1B is a schematic illustration of the stages in air-launching the missile of FIG. 1A.
Figure 1D:
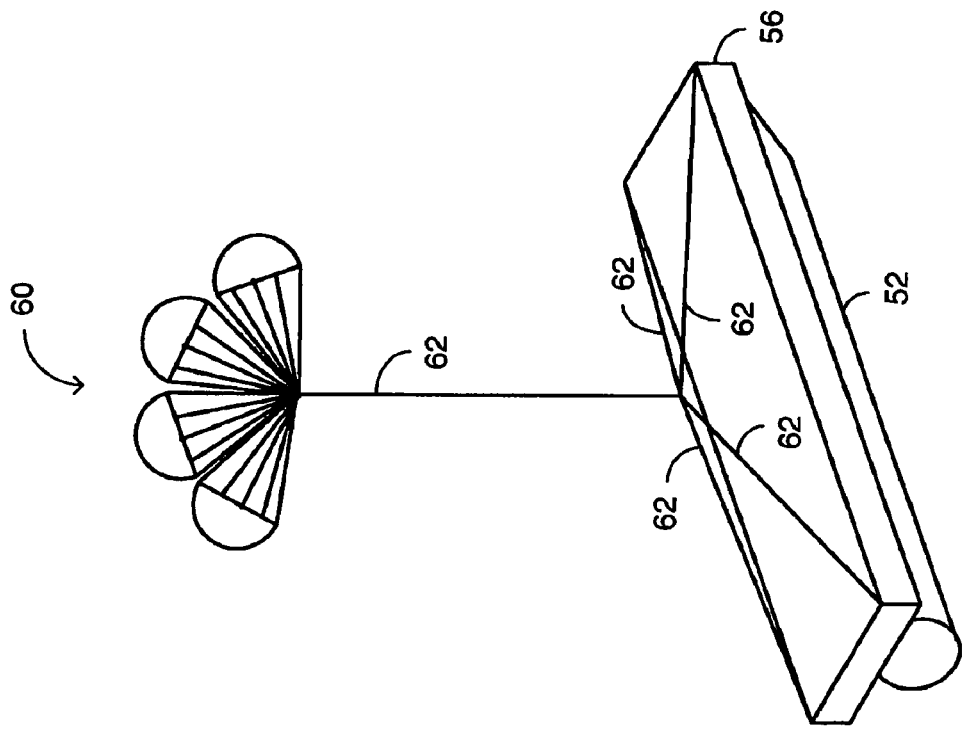
FIG. 1D is a schematic illustration of a top view of the system of FIG. 1B in perspective, at stage III.
Figure 1C:
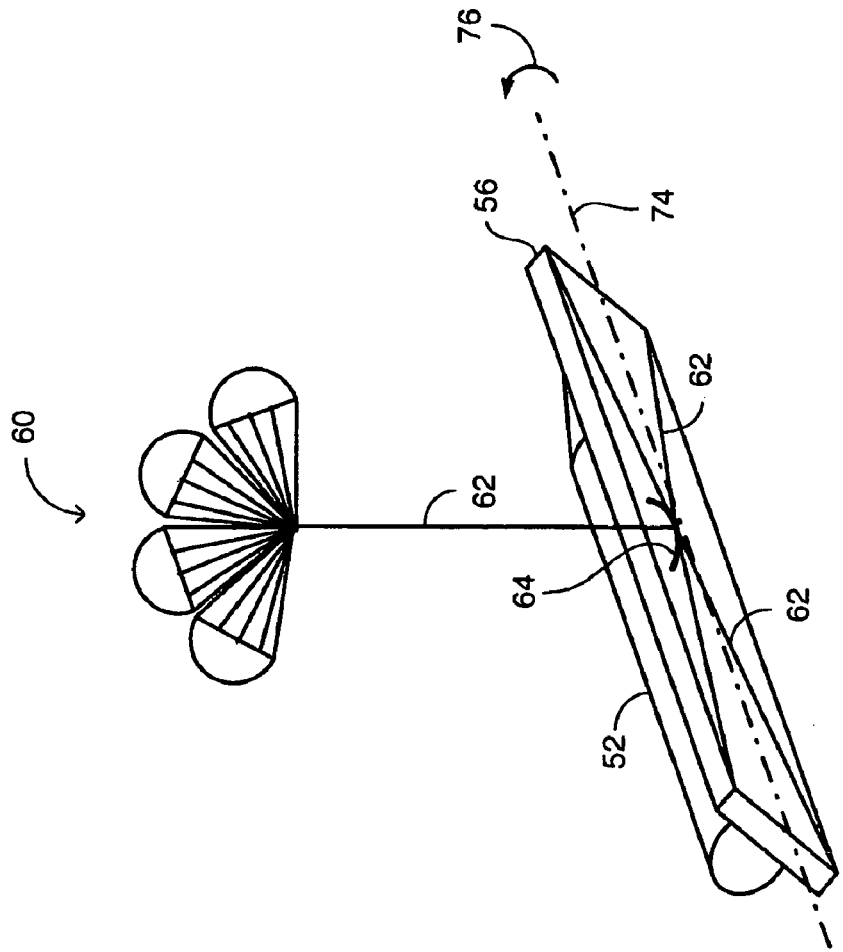
FIG. 1C is a schematic illustration of a bottom view of the system of FIG. 1B in perspective, during the transition from stage II to stage III.
Figure 2B:
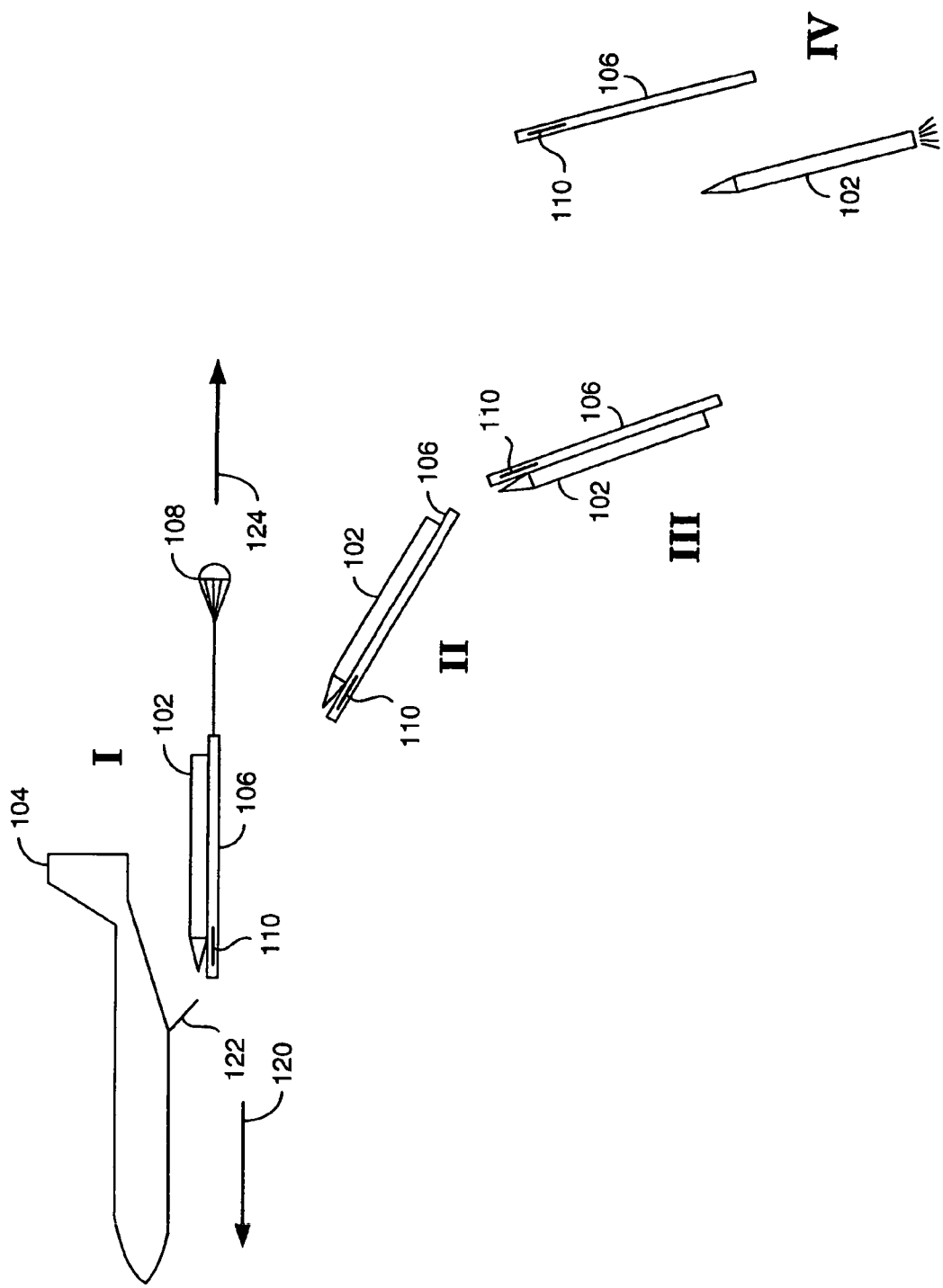
FIG. 2B is a schematic illustration of different stages in launching the missile of FIG. 2A.
Figure 2C:
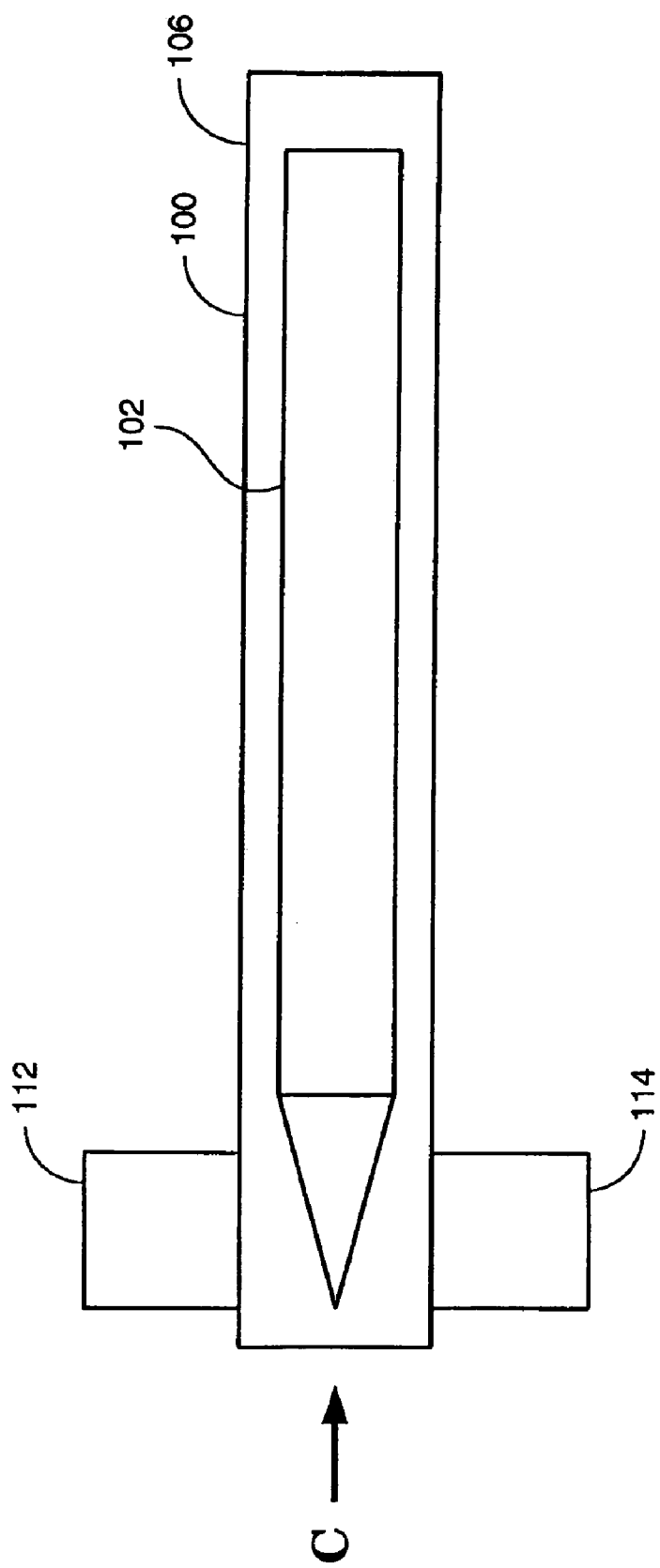
FIG. 2C is a schematic illustration of a top view of the system and of the missile of FIG. 2A, with the control-surface mechanism of the missile support of the system of FIG. 2A, moved from a folded position to an operational position.
Figure 2D:
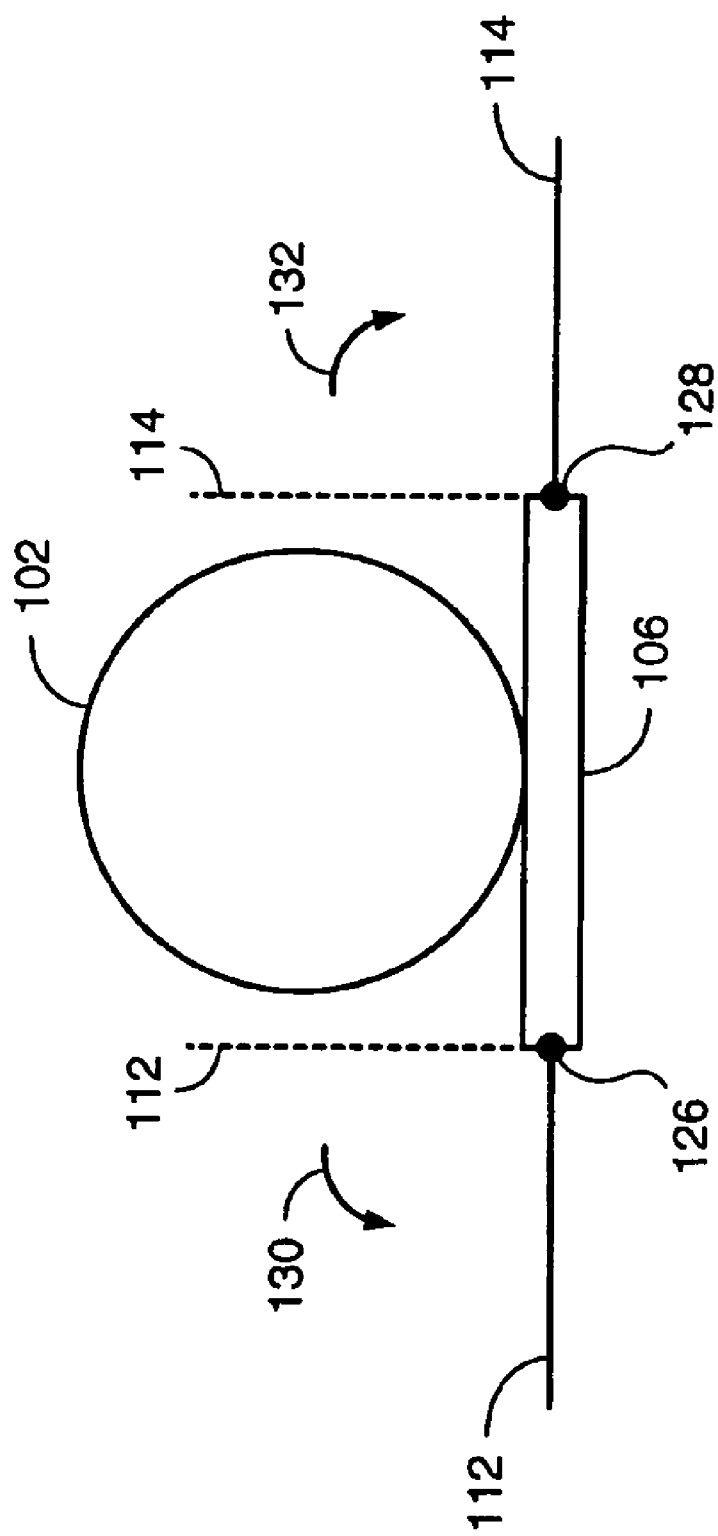
FIG. 2D is a side view of the system and of the missile of FIG. 2C.

Reference is now made to FIGS. 2A, 2B, 2C and 2D. FIG. 2A is a schematic illustration of a system generally referenced 100, constructed and operative according to an embodiment of the disclosed technique, for launching a missile generally referenced 102, the system and the missile being carried inside a flying vehicle generally referenced 104. FIG. 2B is a schematic illustration of different stages in launching the missile of FIG. 2A. FIG. 2C is a schematic illustration of a top view of the system and of the missile of FIG. 2A, with the control-surface mechanism of the missile support of the system of FIG. 2A, moved from a folded position to an operational position. FIG. 2D is a side view (view C) of the system and of the missile of FIG. 2C. The air-launch stage of missile 102 as illustrated in FIG. 2A, is known in the art as the zero stage (i.e., the stage in which flying vehicle 104 carries missile 102 to a region suitable for air-launching missile 102).

Missile 102 is a vehicle, such as a guided missile, spacecraft, rocket, and the like. Missile 102 is launched from flying vehicle 104, toward a region above the atmosphere of the Earth, with the aid of a propulsion system coupled with missile 102. In this case, missile 102 is launched from flying vehicle 104, for missile 102 to be placed in an orbit about the Earth. Alternatively, missile 102 is launched from flying vehicle 104 toward a region within the atmosphere of the Earth. In this case, missile 102 is launched from flying vehicle 104 toward a target in the air, such as an airplane, rotorcraft, another missile similar to missile 102, dirigible, unmanned air vehicle, and the like. Further alternatively, missile 102 is launched from flying vehicle 104, toward a target on or below the surface of the Earth, such as the land, water, and ice bed.

Missile 102 can carry a satellite (not shown), a warhead (not shown), a living body carrying module (not shown) and the like. Missile 102 is employed to place the satellite or the living body carrying module into an orbit around the Earth. Alternatively, missile 102 is an ballistic missile (e.g., ICBM), or a cruise missile which is employed to deliver a certain load to a given target.

System 100 includes a missile support 106, an ejection parachute 108 and a control-surface mechanism 110. A system similar to system 100 can include a plurality of ejection parachutes. Missile support 106 is in form of a substantially rigid platform which supports missile 102 within flying vehicle 104. Missile support 106 also supports missile 102 during ejection from flying vehicle 104 and during a predetermined set of maneuvers after the ejection, in order to bring missile 102 to a predetermined orientation suitable for launching missile 102. The contour of missile support 106 is in form of a polygon, such as a rectangle, a trapezoid, a closed curve, such as ellipse, a combination of one or more lines and one or more curves, and the like.

Control-surface mechanism 110 includes two fins (i.e., control surfaces) 112 and 114 (FIGS. 2C and 2D) and a plurality of hinges 126 and 128. Fins 112 and 114 can rotate about hinges 126 and 128, respectively, in directions referenced by arrows 130 and 132, respectively. Each of fins 112 and 114 is in form of a flat plate. Alternatively, each of fins 112 and 114 is in form of an airfoil which provides lift. The contour of each of fins 112 and 114 is a polygon, such as rectangle, triangle, trapezoid, and the like a closed curve, or a combination of one or more curved lines and one or more straight lines. Missile 102 includes a missile fore section 116 and a missile aft section 118. Generally the satellite, the warhead, or the living body carrying module is stored in missile fore section 116, and the propulsion system (e.g., a rocket motor) is located at missile aft section 118. Flying vehicle 104 is an aircraft suitable for carrying system 100 and missile 102 therein, to a launching region in the atmosphere of the Earth and at a velocity suitable for air-launching missile 102.

With reference to FIG. 2A at zero stage, flying vehicle 104 flies in a direction designated by an arrow 120 relative to a global coordinate system. At zero stage, flying vehicle 104 flies within the atmosphere of the Earth in the launching region. Missile 102 is air-launched from this launching region, in order to place the payload, for example the satellite or the living body carrying module, in a predetermined orbit around the Earth. Alternatively, flying vehicle 104 flies within the atmosphere of a planet other than the Earth, in order to launch missile 102 from a launching region within the atmosphere of the planet and place the payload in an orbit around the planet. Further alternatively, missile 102 is launched from a launching region within the atmosphere of the planet, toward a target within the atmosphere or the surface of the planet.

Missile 102 is coupled with missile support 106 by one or more releasable mechanisms (not shown), such as metallic band, metallic cable, composite material band (e.g., Kevlar), composite material cable, mechanical latch (e.g., a pylon), rigid circumferential support element (e.g., a clamp), and the like. The rigid circumferential support element can be in form of a rotating element having a curvature similar to that of an outer surface of missile 102. The releasable mechanism can be activated by a pyrotechnic element, electric element (e.g., electric motor), electromagnetic element (e.g., electromagnet), hydraulic element (e.g., cylinder, actuator), pneumatic element, and the like. Missile 102 and missile support 106 are located within flying vehicle 104, such that the direction from missile aft section 118 to missile fore section 116 is substantially along arrow 120.

Control-surface mechanism 110 further includes one or more positioning actuators (not shown) and a positioning controller (not shown). Fins 112 and 114 are coupled with missile support 106 by the positioning actuators. The positioning actuators are coupled with the positioning controller. The positioning controller can be a timer, a processor, an orientation detector, and the like. The positioning actuators move fins 112 and 114 according to a signal received from the positioning controller.

While system 100 and missile 102 are carried within flying vehicle 104 (i.e., at zero stage), fins 112 and 114 (designated by dotted lines in FIG. 2D) are folded about missile fore section 116. Ejection parachute 108 is packed at the zero stage and coupled with missile support 106 at a location substantially close to missile aft section 118.

Flying vehicle 104 includes a door 122 (FIG. 2B) at an aft section thereof to allow system 100 and missile 102 exit flying vehicle 104 from an opening in the aft section, and to be ejected from flying vehicle 104. Missile support 106 is coupled with flying vehicle 104 by a rolling mechanism, such as a series of wheels (not shown), sliding surfaces (not shown), and the like. The rolling mechanism allows missile support 106 to move out of flying vehicle 104, when missile support 106 which carries missile 102, is pulled out of flying vehicle 104 by ejection parachute 108.

With reference to FIG. 2B, at stage I, door 122 is opened and ejection parachute 108 is deployed. Ejection parachute 108 pulls system 100 and missile 102 out of flying vehicle 104, in a direction designated by an arrow 124 opposite to the direction of arrow 120 and relative to flying vehicle 104. It is noted that at stage I, movement of system 100 and missile 102 is represented also by a velocity vector (not shown) along arrow 120 relative to the global coordinate system.

Concurrently at stage I, the positioning actuators move fins 112 and 114 about hinges 126 (FIG. 2D) and 128, respectively, in directions 130 and 132, respectively, from the folded position to the operational position, according to a signal received from the positioning controller. Depending on the type of the positioning controller, the positioning actuators move fins 112 and 114 at a predetermined time, according to a signal received from a timer or from a processor, or when system 100 and missile 102 reach a predetermined orientation (according to a signal received from an orientation detector). This is so, in order to prevent fins 112 and 114 move from the folded position to the operational position, before system 100 and missile 102 exit flying vehicle 104, or fins 112 and 114 colliding with parts of flying vehicle 104.

In stage II, ejection parachute 108 is decoupled from missile support 106, and missile support 106 and missile 102 commence a free fall motion. The configuration of missile 102 and missile support 106 in stage II, where missile support 106 is located below missile 102, is mechanically unstable. Thus, missile 102 and missile support 106 have a tendency to move toward a stable condition, and thus roll about a longitudinal axis (not shown) of either missile 102 or missile support 106, thereby reaching the configuration of stage III. Control-surface mechanism 110 can be employed to aid in performing the rolling motion.

Control-surface mechanism 110 can further include one or more maneuvering actuators (not shown) and a maneuvering controller (not shown). Fins 112 and 114 are coupled with missile support 106 by the maneuvering actuators. The maneuvering actuators are coupled with the maneuvering controller. The maneuvering controller can be integrated with the positioning controller. Fins 112 and 114 apply aerodynamic forces on missile support 106 of such magnitude and direction, to enable missile support 106 and missile 102 to reach a predetermined orientation (stage III) suitable for launching missile 102 toward the predetermined orbit. The maneuvering actuators move fins 112 and 114, according to a signal received from the maneuvering controller, in order to maneuver missile support 106 and missile 102 to the predetermined orientation.

Alternatively, control-surface mechanism 110 can be devoid of any maneuvering actuator. In this case, fins 112 and 114 maneuver missile support 106 while being stationary relative to missile support 106 in all stages subsequent to stage I.

Each of the positioning actuators can be either in form of a variable displacement actuator (e.g., electric motor, hydraulic actuator, pneumatic actuator), or a constant displacement actuator (e.g., electromagnet, pyrotechnic element, mechanical latch, spring loaded element). The variable displacement actuator moves fins 112 and 114 form the folded position to the operational position, by applying a positive force thereon. The constant displacement actuator releases fins 112 and 114, whereupon each of fins 112 and 114 moves from the folded position to the operational position, by aerodynamic forces applied thereon. Each of the maneuvering actuators can be of the hydraulic, pneumatic, electric type, and the like.

System 100 further includes a release controller (not shown) coupled with the releasable mechanisms. The release controller is in form of a timer, orientation detector, processor, and the like. The orientation detector detects the predetermined orientation of missile 102 and of missile support 106. The release controller can be integrated with either one or both of the positioning controller and maneuvering controller.

In stage IV, the releasable mechanisms are activated according to a signal received from the release controller, wherein missile support 106 is uncoupled from missile 102. At this stage, the propulsion system of missile 102 is activated, thereby launching missile 102 after reaching the predetermined orientation in the atmosphere. The orientation of missile 102 may change, after being uncoupled from missile support 106. Hence, the orientation of missile 102 and missile support 106 in stage IV, may be selected such that missile 102 is launched at an orientation suitable for launch, after being uncoupled from missile support 106.

Missile support 106 drops to the surface of the Earth by free fall. Alternatively, missile support 106 can include a set of recovery parachutes which are activated in order to control the descent of missile support 106 to a predetermined location on the ground or the ocean, suitable for recovering of missile support 106.

It is noted that instead of ejection parachute 108, missile support 106 can be coupled with flying vehicle 104 by one or more ejection elements (not shown), such as hydraulic, pneumatic, electric, mechanical (e.g., a loaded spring mechanism) elements, and the like. In this case, in stage I, the ejection elements push system 100 and missile 102 out of flying vehicle 104.

System 100 can further include a first communication interface (not shown) coupled with the positioning actuators, maneuvering actuators, releasable mechanisms and the ejection elements. The positioning actuators, maneuvering actuators, releasable mechanisms and the ejection elements wirelessly communicate with a remote controller (not shown) via a second communication interface (not shown) coupled with the remote controller. The remote controller can be located remote from system 100, such as in missile 104, in another missile (not shown), in a satellite (not shown) or on the Earth.

Figure 3:
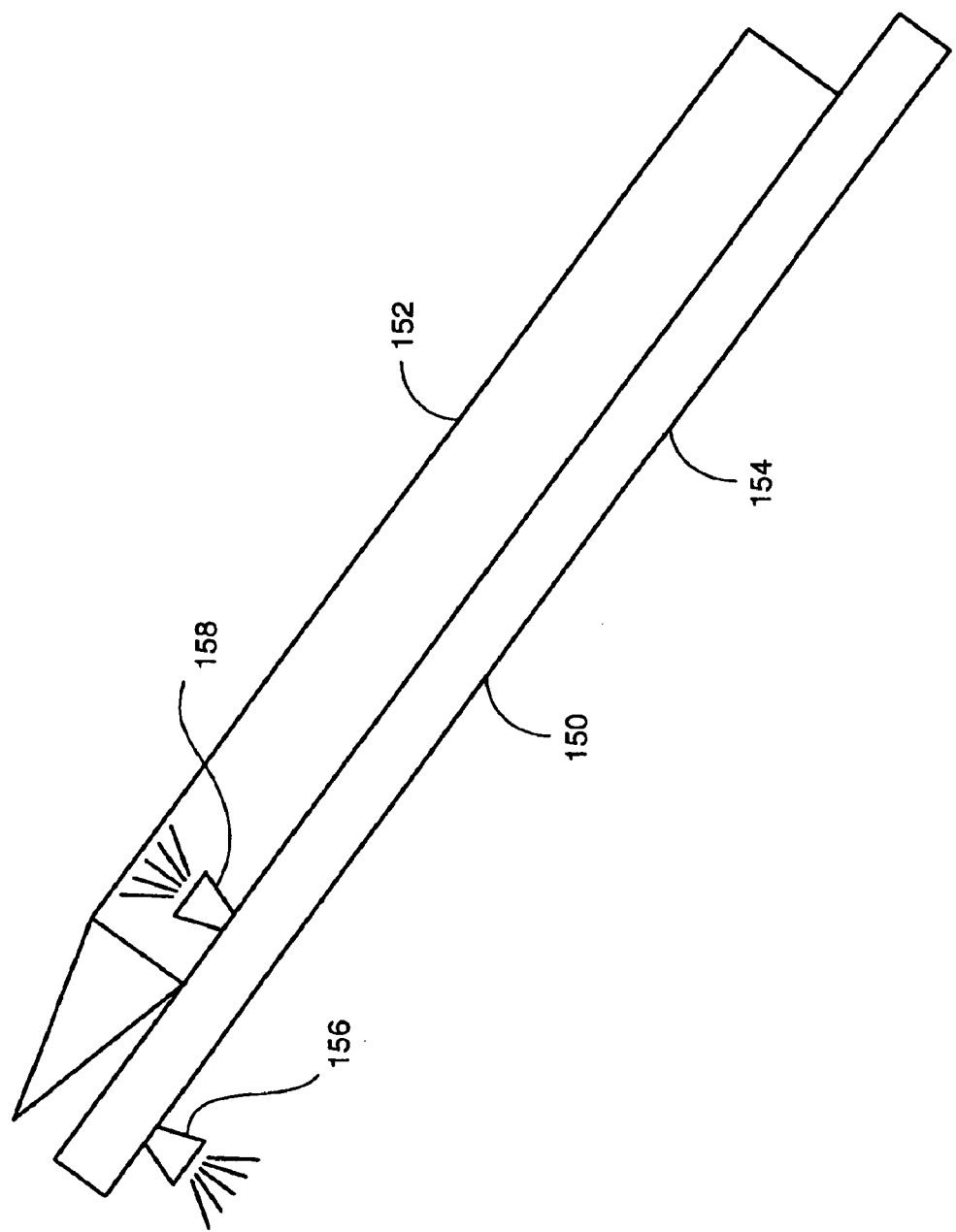
FIG. 3 is a schematic illustration of a system for launching a missile, constructed and operative according to another embodiment of the disclosed technique.

Reference is now made to FIG. 3, which is a schematic illustration of a system generally referenced 150, constructed and operative according to another embodiment of the disclosed technique, for launching a missile generally referenced 152. System 150 includes a missile support 154, two or more maneuvering elements, such as maneuvering elements 156 and 158 and a maneuvering controller (not shown).

Missile support 154 is similar to missile support 106 (FIG. 2A), as described herein above. Each of maneuvering elements 156 and 158 is a propulsion system, such as a micro-rocket motor, thruster, pressurized-gas operated system, and the like. The maneuvering controller can be a processor. Maneuvering elements 156 and 158 are coupled with the maneuvering controller. Each of maneuvering elements 156 and 158 operate according to a signal received from the maneuvering controller.

Missile 152 is coupled with missile support 154 by one or more releasable mechanisms as described herein above in connection with FIG. 2A. Maneuvering elements 156 and 158 are coupled with missile support 154. System 150 is similar to system 100 (FIG. 2A), except that instead of control-surface mechanism 110, maneuvering elements 156 and 158 are employed to aid system 150 and missile 152 to perform the rolling motion, and to maneuver system 150 and missile 152, to the predetermined orientation suitable for launching missile 152. System 150 can be similar also to system 100 (FIG. 2A), except that instead of control-surface mechanism 110, maneuvering elements 156 and 158 are employed to aid the missile support and the missile to perform the rolling motion (FIG. 2B), and to maneuver the missile support and the missile, toward the predetermined orientation suitable for launching the missile.

Figure 4A:
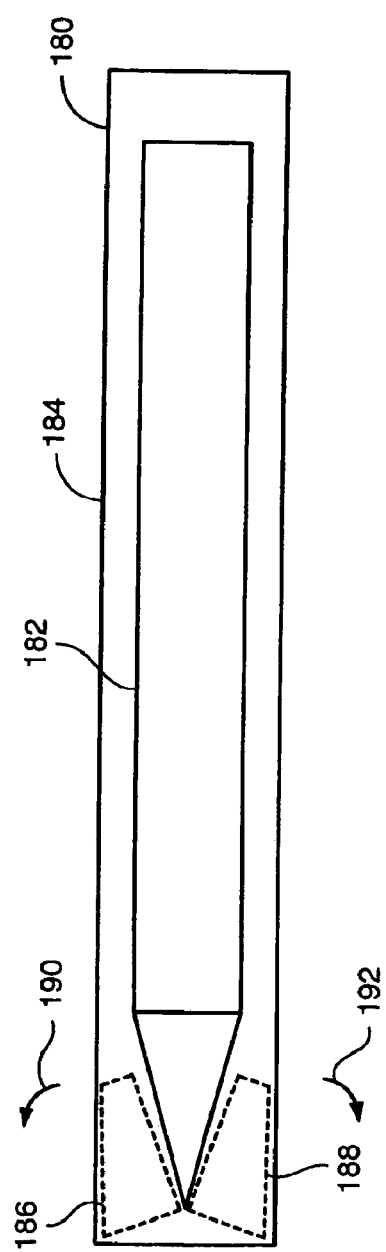
FIG. 4A is a schematic illustration of a system for launching a missile, constructed and operative according to a further embodiment of the disclosed technique.
Figure 4B:
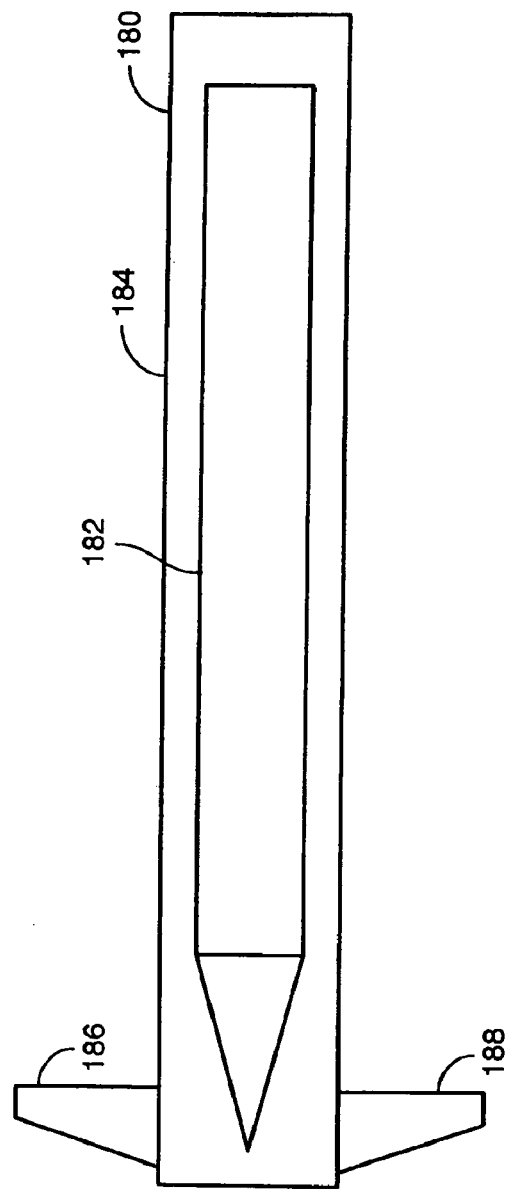
FIG. 4B is a schematic illustration of the system of FIG. 4A, in a mode which the fins of the system of FIG. 4A are unfolded to an operational position.

Reference is now made to FIGS. 4A and 4B. FIG. 4A is a schematic illustration of a system generally referenced 180, constructed and operative according to a further embodiment of the disclosed technique, for launching a missile generally referenced 182. FIG. 4B is a schematic illustration of the system of FIG. 4A, in a mode which the fins of the system of FIG. 4A are unfolded to an operational position.

System 180 includes a missile support 184 and two fins 186 and 188. Fins 186 and 188 aid system 180 and missile 182 perform the rolling motion in transition from a stage similar to stage II (FIG. 2B) to another stage similar to stage III, as described herein above. Fins 186 and 188, furthermore maneuver missile support 184 toward a predetermined orientation suitable for launching missile 182, as in stage III (FIG. 2B), as described herein above. Missile 182 is coupled with missile support 184 by one or more releasable mechanisms similar to the ones described herein above in connection with FIG. 2A.

With reference to FIG. 4A, fins 186 and 188 are coupled with missile support 184 by a first hinge (not shown) and a second hinge (not shown), respectively. Fins 186 and 188 are free to rotate about the first hinge and the second hinge, respectively, in directions designated by arrows 190 and 192. System 180 includes one or more positioning actuators (not shown) coupled with fins 186 and 188 and with missile support 184, to allow rotation of fins 186 and 188 about the first hinge and the second hinge, respectively. Missile support 184 includes one or more slots (not shown) to contain fins 186 and 188 in a folded position, while system 180 and missile 182 are being carried by a flying vehicle—not shown (i.e., at the zero stage, as described herein above in connection with FIG. 2A).

With reference to FIG. 4B, in a stage similar to stage I of FIG. 2A, the positioning actuators rotate fins 186 and 188 about the first hinge and the second hinge, respectively, in directions 190 and 192, respectively. Thus, fins 186 and 188 move out of the slots from the folded position to an operational position, ready to aid missile support 184 and missile 182 perform the rolling motion, and to maneuver missile support 184 and missile 182 to a predetermined orientation. System 180 can further include one or more maneuvering actuators (not shown) and a maneuvering controller (not shown) as described herein above in connection with FIG. 2B. The maneuvering actuators are coupled with fins 186 and 188 and with the maneuvering controller. Maneuvering actuators move fins 186 and 188 according to a signal received from the maneuvering controller, to aid missile support 184 and missile 182 perform the rolling motion, and to maneuver missile support 184 and missile 182 to the predetermined orientation.

Figure 5A:
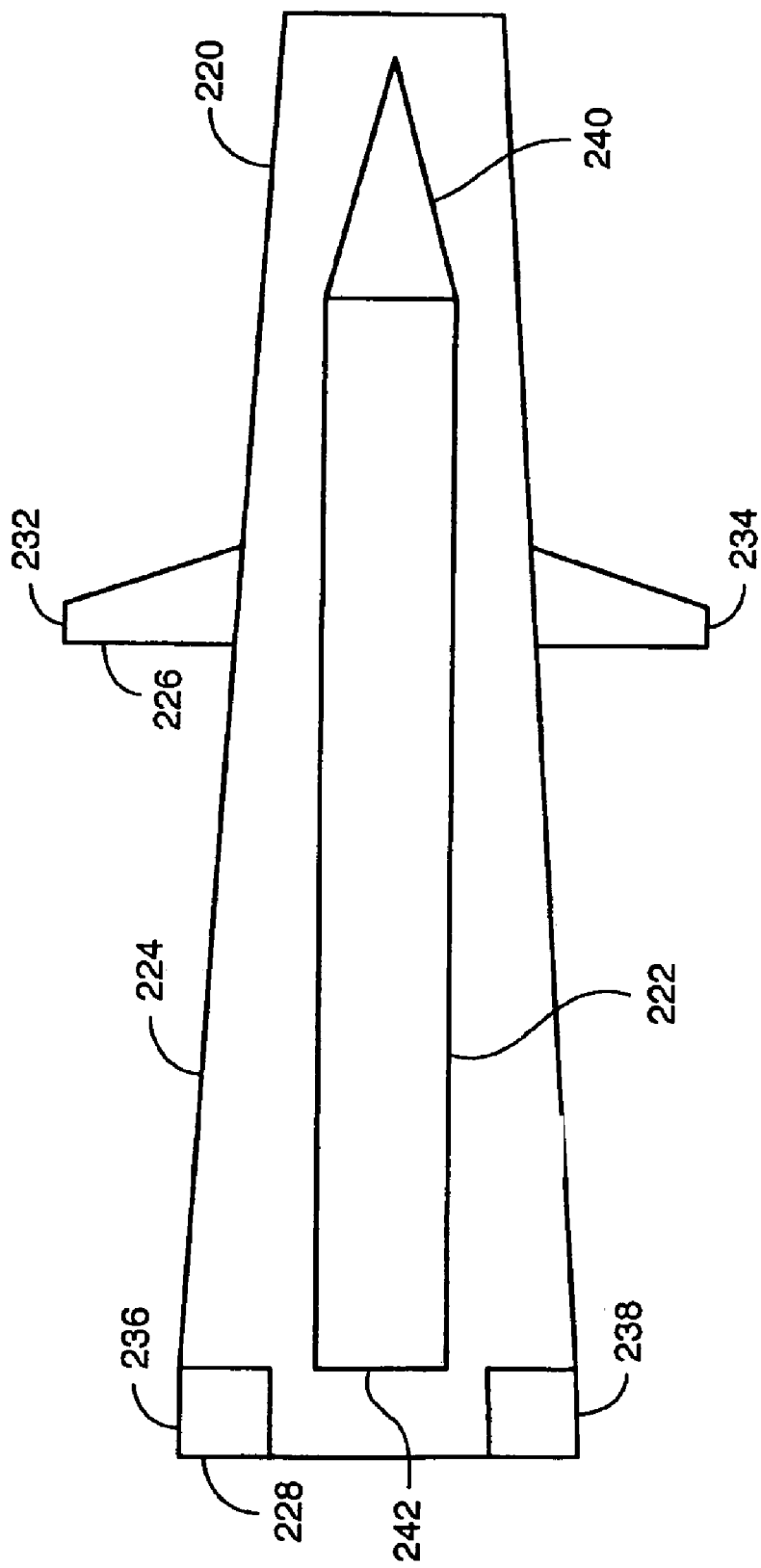
FIG. 5A is a schematic illustration of a system for launching a missile, constructed and operative according to another embodiment of the disclosed technique.
Figure 5B:
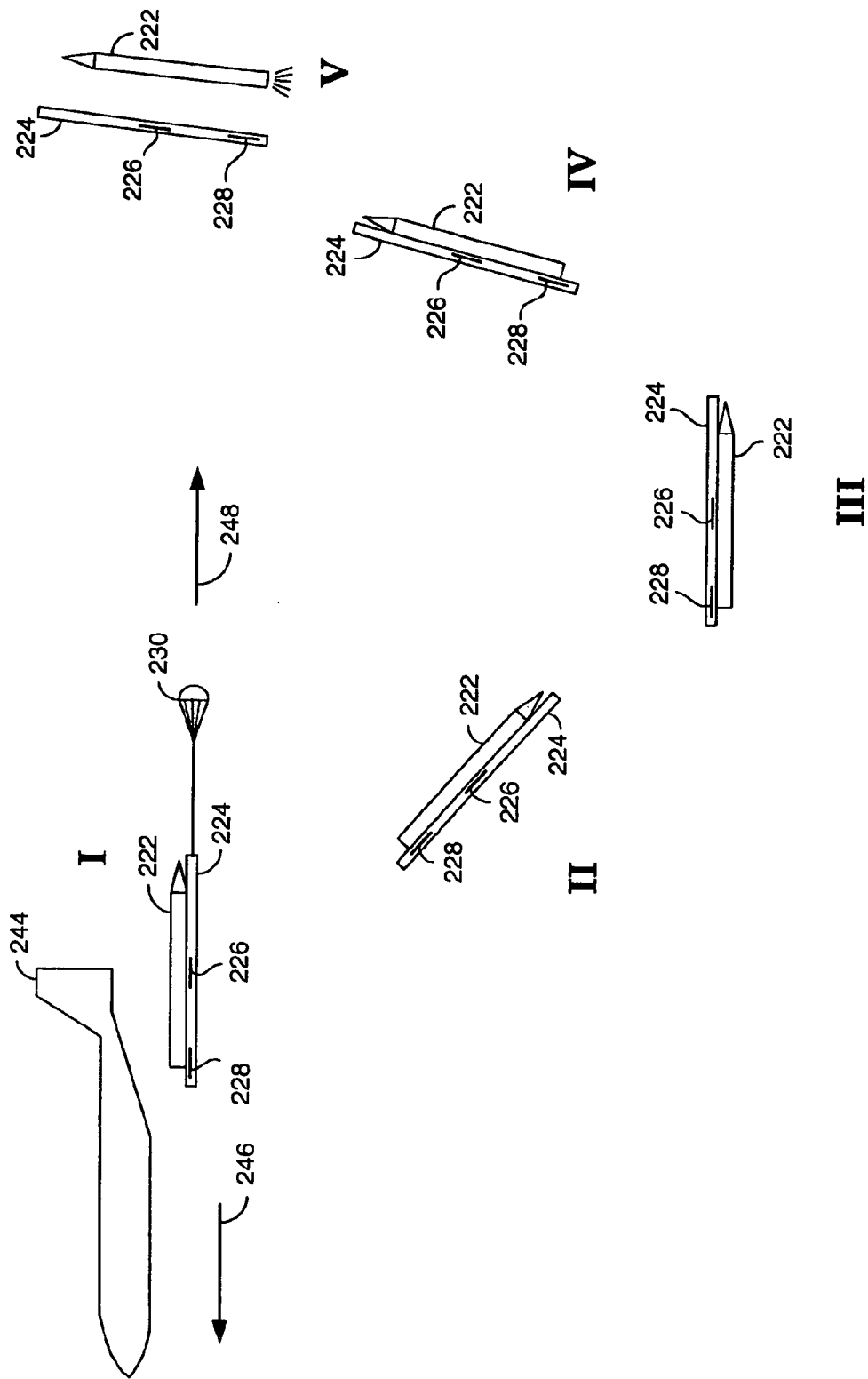
FIG. 5B is a schematic illustration of different stages in launching the missile of FIG. 5A.

Reference is now made to FIGS. 5A and 5B. FIG. 5A is a schematic illustration of a system generally referenced 220, constructed and operative according to another embodiment of the disclosed technique, for launching a missile generally referenced 222. FIG. 5B is a schematic illustration of different stages in launching the missile of FIG. 5A.

System 220 includes a missile support 224, a foldable control-surface mechanism 226, an exposed control-surface mechanism 228 and an ejection parachute 230. Foldable control-surface mechanism 226 includes foldable control surfaces 232 and 234 and necessary components for unfolding foldable control surfaces 232 and 234, such as one or more positioning actuators (not shown), a positioning controller (not shown), and the like. Foldable control-surface mechanism 226 can include other components for moving foldable control surfaces 232 and 234 to maneuver missile support 224, such as one or more maneuvering actuators (not shown), a maneuvering controller (not shown), and the like.

Exposed control-surface mechanism 228 includes exposed control surfaces 236 and 238. Exposed control-surface mechanism 228 can be either movable or stationary. Exposed control-surface mechanism 228 can include other components for moving exposed control surfaces 236 and 238 to maneuver missile support 224, such as one or more maneuvering actuators (not shown), a maneuvering controller (not shown), and the like. Missile 222 includes a fore section 240 and an aft section 242. Fore section 240 includes a payload (not shown) and aft section 242 includes a propulsion system (not shown). Missile 222 is coupled with missile support 224 by one or more releasable mechanisms (not shown). Foldable control-surface mechanism 226 is located approximately midway between fore section 240 and aft section 242. Exposed control-surface mechanism 228 is located substantially close to aft section 242.

Either of foldable control-surface mechanism 226 or exposed control-surface mechanism 228 can be replaced with two or more maneuvering elements similar to maneuvering elements 156 (FIG. 3) and 158, as described herein above. Furthermore, any combination of the foldable control-surface mechanism, the exposed control-surface mechanism and the maneuvering elements can be employed in a system similar to system 220.

At zero stage (not shown) a flying vehicle 244 flies in a direction designated by an arrow 246 relative to a global coordinate system, in a launching region suitable for launching missile 222, while carrying system 220 and missile 222 there within. System 220 and missile 222 are located within flying vehicle 244, such that the direction from aft section 242 to fore section 240 is opposite to the direction of arrow 246. At zero stage, ejection parachute 230 is in a packed condition.

With reference to FIG. 5B, at stage I, ejection parachute 230 is activated wherein ejection parachute 230 pulls system 220 and missile 222, out of flying vehicle 244 in a direction designated by an arrow 248 relative to flying vehicle 244 and opposite to the direction of arrow 246. At stage I, the direction from aft section 242 to fore section 240 points substantially opposite to arrow 246. It is noted that at stage I, mechanisms other than ejection parachute 230 can be employed to eject system 220 and missile 222 from flying vehicle 244, as described herein above in connection with FIG. 2B. At stage II, ejection parachute 230 is uncoupled from missile support 224, and both missile 222 and missile support 224 descend by free fall. The configuration of missile 222 and missile support 224 in stage II, where missile support 224 is located below missile 222, is mechanically unstable. Thus, missile 222 and missile support 224 have a tendency to move toward a stable condition, and thus roll about a longitudinal axis (not shown) of either missile 222 or missile support 224, thereby reaching the configuration of stage III (where missile support 224 is located on the top of missile 222). Exposed control-surface mechanism 228 or the maneuvering elements can be employed to aid in performing the rolling motion.

In case missile 222 and missile support 224 are capable to perform the roll without the aid of either exposed control-surface mechanism 228 or the maneuvering elements, exposed control-surface mechanism 228 and the maneuvering elements can be eliminated from system 220. In this case, foldable control-surface mechanism 226 is employed to aid missile support 224 and missile 222 in performing the rolling motion, and to maneuver missile support 224 and missile 222 to the predetermined orientation.

After performing the roll, the positioning actuators move foldable control surfaces 232 and 234 from the folded position to an operational position, according to a signal received from the positioning controller. In stage IV, foldable control-surface mechanism 226 maneuvers missile 222 and missile support 224 to a predetermined orientation suitable for launching missile 222. Either or both of exposed control-surface mechanism 228 and the maneuvering elements can be employed to aid foldable control-surface mechanism 226 maneuvering missile 222 and missile support 224, to the predetermined orientation. In stage V, the releasable mechanism uncouples missile support 224 from missile 222 and the propulsion system is activated thereby launching missile 222.

It is noted that foldable control-surface mechanism 226 is the primary control-surface mechanism for maneuvering missile 222 and missile support 224 to the predetermined orientation, and that exposed control-surface mechanism 228 is employed to provide additional maneuvering capability. Hence, in case foldable control-surface mechanism 226 alone is capable to maneuver missile 222 and missile support 224 to the predetermined orientation, exposed control-surface mechanism 228 can be eliminated from system 220.

It is further noted that instead of two exposed control surfaces, the exposed control-surface mechanism can include only a single exposed control surface (not shown). In this case, the exposed control surface is substantially symmetric about the longitudinal axis of the missile support, such as to aid the foldable control-surface mechanism to maneuver the missile and the missile support to the predetermined orientation. The parameters and location of this exposed control surface are such that the exposed control surface does not induce any roll about the longitudinal axis of the missile support.

Figure 6:
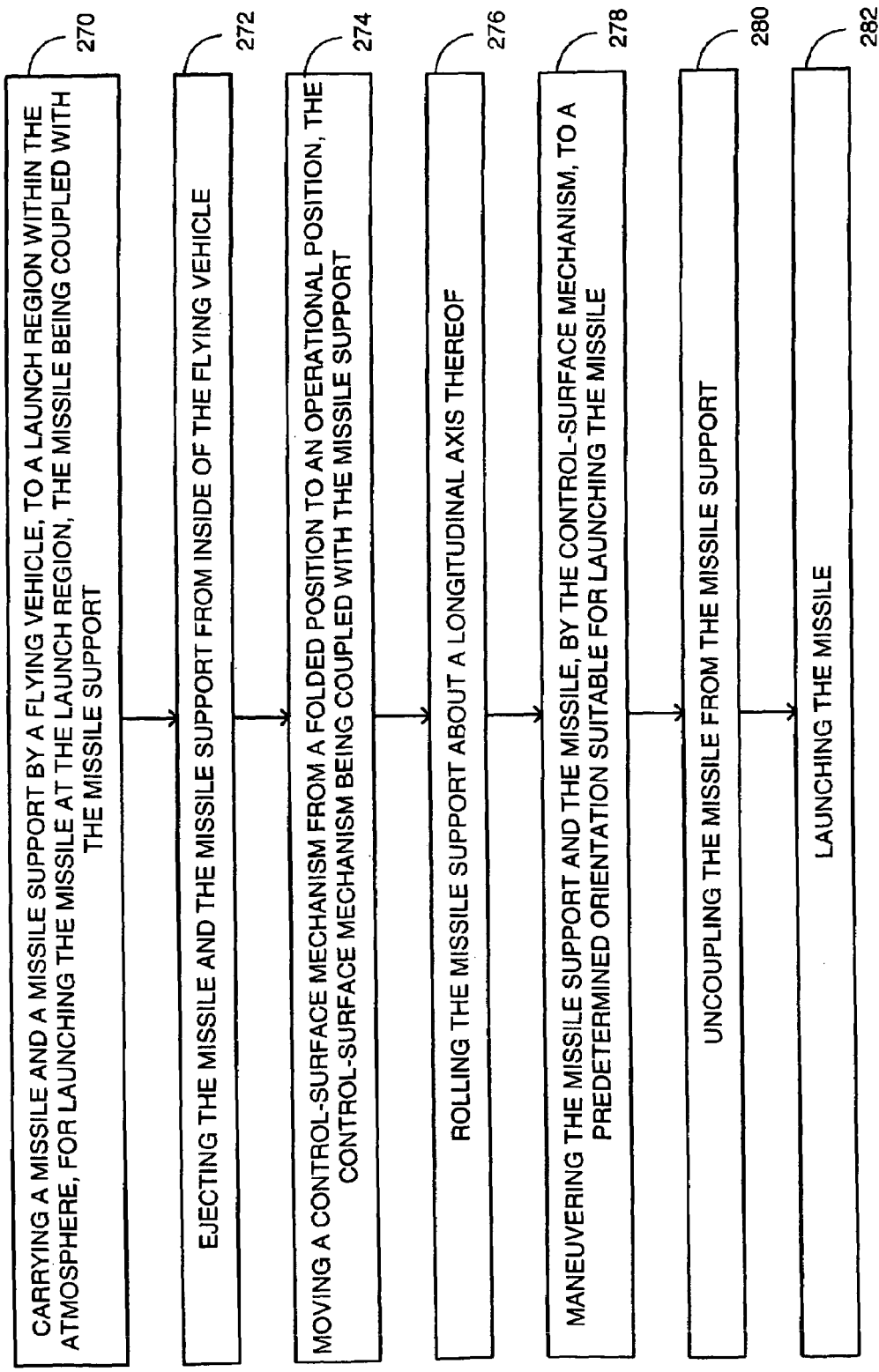
FIG. 6 is a schematic illustration of a method for launching the missile of FIG. 2A, operative according to a further embodiment of the disclosed technique.

Reference is now made to FIG. 6, which is a schematic illustration of a method for launching the missile of FIG. 2A, operative according to a further embodiment of the disclosed technique. In procedure 270, a missile and a missile support is carried by a flying vehicle to a launch region within the atmosphere, for launching the missile at the launch region, the missile being coupled with the missile support. With reference to FIG. 2A, at zero stage, flying vehicle 104 carries missile 102 and missile support 106 to a launch region within the atmosphere.

In procedure 272, the missile and the missile support are ejected from inside of the flying vehicle. With reference to FIG. 2B, in stage I, door 122 is opened and ejection parachute 108 is activated, thereby pulling missile 102 and missile support 106 from inside of flying vehicle 104.

In procedure 274, a control-surface mechanism is moved from a folded position to an operational position, the control-surface mechanism being coupled with the missile support. With reference to FIGS. 2C and 2D, the positioning actuators of control-surface mechanism 110, move control surfaces 112 and 114 from a folded position to an operational position.

In procedure 276, the missile support is rolled about a longitudinal axis thereof. With reference to FIG. 2B, in transition from stage II to stage III, missile support 106 and missile 102 roll about a longitudinal axis of missile support 106. This rolling motion occurs due the mechanically unstable condition of missile support 106 and missile 102 at stage II. However, control-surface mechanism 110 can be employed to complete the rolling motion in less time. With reference to FIG. 3, maneuvering elements 156 and 158 can be employed to aid the rolling motion. With reference to FIG. 5A, exposed control-surface mechanism 228 can be employed to aid the rolling motion.

In procedure 278, the control-surface mechanism maneuvers the missile and the missile support to a predetermined orientation suitable for launching the missile. With reference to FIG. 2B, in stage III, control-surface mechanism 110 maneuvers missile 102 and missile support 106 to a predetermined orientation suitable for launching missile 102.

In procedure 280, the missile is uncoupled from the missile support. With reference to FIG. 2B, in stage IV, the releasable mechanism uncouples missile 102 from missile support 106 and the propulsion system of missile 102 is activated, thereby launching missile 102 (procedure 280). It is noted that this method of launching a missile, can be employed also to launch missile 222 (FIG. 5B), as described herein above.

According to another aspect of the disclosed technique, the missile is coupled with the aircraft, external to the aircraft, via a missile support. After decoupling from the aircraft, the missile support performs necessary aerodynamic maneuvers via a plurality of control surfaces coupled therewith, in order to reach a launch orientation. At the launch orientation the missile is decoupled from the missile support, the missile is launched, and the missile support descends toward the surface of the Earth.

Figure 7A:
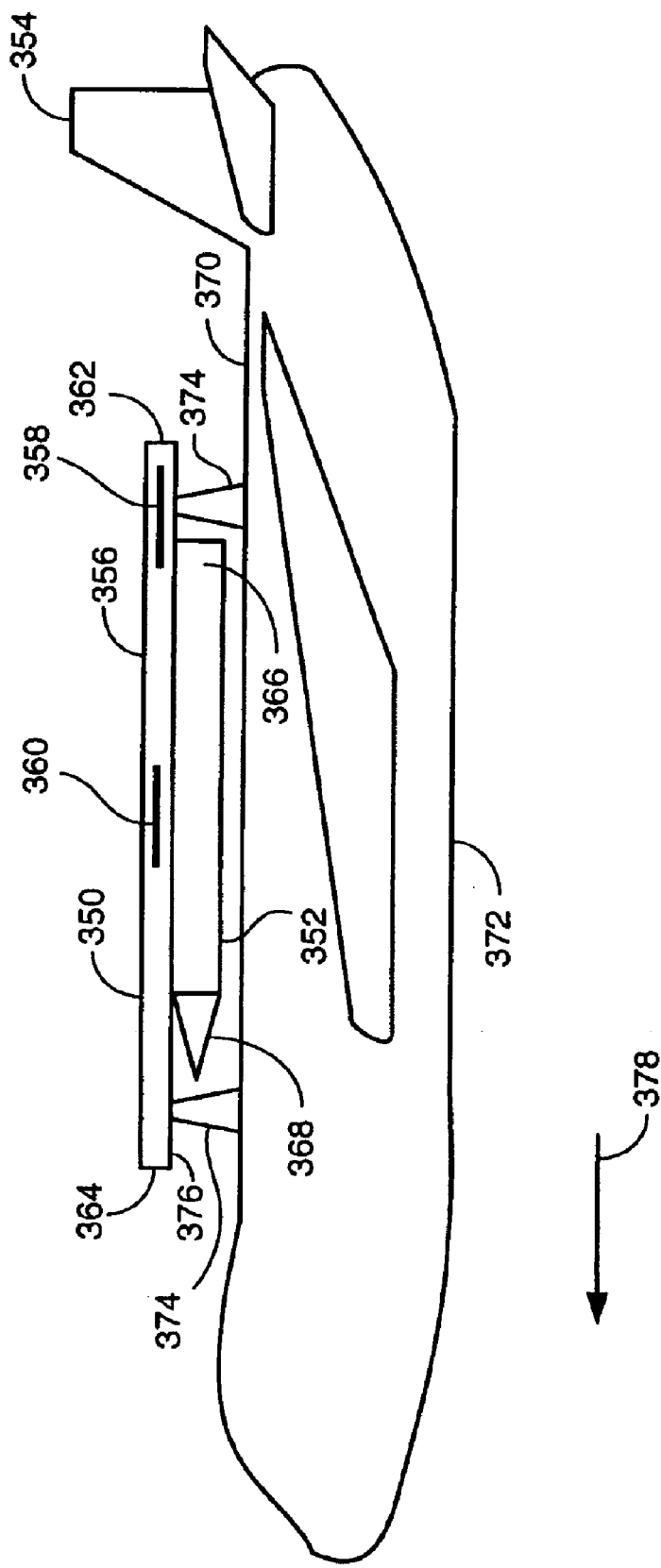
FIG. 7A is a schematic illustration of a system constructed and operative according to another embodiment of the disclosed technique, for launching a missile, the system and the missile being carried external to a flying vehicle.

Reference is now made to FIGS. 7A and 7B. FIG. 7A is a schematic illustration of a system generally referenced 350, constructed and operative according to another embodiment of the disclosed technique, for launching a missile generally referenced 352, the system and the missile being carried external to a flying vehicle generally referenced 354. FIG. 7B is a schematic illustration of different stages in launching the missile of FIG. 7A. The air-launch stage of missile 352 as illustrated in FIG. 7A, is known in the art as the zero stage (i.e., the stage in which flying vehicle 354 carries missile 352 to a region suitable for air-launching missile 352). Missile 352 is similar to missile 102 (FIG. 2A) as described herein above.

With reference to FIG. 7A, system 350 includes a missile support 356 and a control-surface mechanism (not shown). The control-surface mechanism includes a pair of elevators 358 (i.e., control surfaces), a pair of ailerons 360 (i.e., control surfaces), one or more maneuvering actuators (not shown), a maneuvering controller (not shown), one or more positioning actuators (not shown) and a positioning controller (not shown). Missile support 356 includes an aft portion 362 and a fore portion 364. Missile 352 includes an aft portion 366 and a fore portion 368.

Elevators 358 are coupled with missile support 356 at aft portion 362. Ailerons 360 are coupled with missile support 356 at a mid portion thereof. The maneuvering actuators are coupled with elevators 358, ailerons 360 and with the maneuvering controller. The positioning actuators are coupled with elevators 358, ailerons 360 and with the positioning controller. At the zero stage (FIG. 7A), ailerons 360 are in a folded position within missile support 356. The positioning actuators move ailerons 360 from the folded position to an operational position, according to an output from the positioning controller.

Each of the positioning actuators can be either in form of a variable displacement actuator (e.g., electric motor, hydraulic actuator, pneumatic actuator), or a constant displacement actuator (e.g., electromagnet, pyrotechnic element, mechanical latch, spring loaded element). The variable displacement actuator moves ailerons 360 from the folded position to the operational position, by applying a positive force thereon. The constant displacement actuator releases ailerons 360, whereupon each of ailerons 360 moves from the folded position to the operational position, by aerodynamic forces applied thereon. Each of the maneuvering actuators can be of the hydraulic, pneumatic, electric type, and the like.

At the zero stage, elevators 358 are in an operational position. Missile support 356 can be aerodynamically maneuvered by moving each of elevators 358 and ailerons 360. Missile support 356 is coupled with an upper portion 370 of a fuselage 372 of flying vehicle 354, by a plurality of pylons 374. Each of pylons 374 includes a disengagement mechanism (not shown) to decouple missile support 356 from pylons 374, and thus from fuselage 372. Alternatively, the disengagement mechanism can be incorporated with system 350. The disengagement mechanism can be a hydraulic, pneumatic, pyrotechnic, electric, mechanical type, and the like.

Missile 352 is coupled with a bottom surface 376 of missile support 356 by one or more release mechanisms (not shown), such as metallic band, metallic cable, composite material band (e.g., Kevlar), composite material cable, mechanical latch (e.g., a pylon), rigid circumferential support element (e.g., a clamp), and the like. The rigid circumferential support element can be in form of a rotating element having a curvature similar to that of an outer surface of missile 352. Thus, missile 352 is located between fuselage 372 and missile support 356, prior to decoupling of system 350 from fuselage 372. The release mechanism can be activated by a pyrotechnic element, electric element (e.g., electric motor), electromagnetic element (e.g., electromagnet), hydraulic element (e.g., cylinder, actuator), pneumatic element, and the like. Flying vehicle 354 is similar to flying vehicle 104 (FIG. 2A) as described herein above.

System 350 further includes a release controller (not shown) as described herein above in connection with FIG. 2A. Missile support 356 is in form of a substantially rigid platform which supports missile 352. Missile support 356 also supports missile 352 during a predetermined set of maneuvers after being decoupled from fuselage 372, in order to bring missile 352 to a predetermined orientation suitable for launching missile 352. The contour of missile support 356 is in form of a polygon, such as a rectangle, a trapezoid, a closed curve, such as ellipse, a combination of one or more lines and one or more curves, and the like.

At zero stage (FIG. 7A), flying vehicle 354 flies within the atmosphere of the Earth in the launching region in a direction designated by an arrow 378 relative to a global coordinate system. Missile 352 is air-launched from this launching region, in order to place the payload in a predetermined orbit around the Earth. Missile 352 is coupled with missile support 356 and missile support 356 is coupled with fuselage 372, such that the direction from aft portion 362 to fore portion 364, and the direction from aft portion 366 to fore portion 368, is substantially along arrow 378.

With reference to FIG. 7B, at stage I, for example while flying vehicle 354 is performing an aerodynamic maneuver to cancel the effect of the gravity, the disengagement mechanism is activated, thereby decoupling missile 352 and missile support 356 from fuselage 372. At this stage, missile 352 and missile support 356 continue to move at a velocity along arrow 378 even after being decoupled from fuselage 372. At this stage, the positioning actuators move ailerons 360 from the folded position to the operational position, according to an output from the positioning controller. In stage II, the maneuvering actuator moves elevators 358 and ailerons 360, according to an output of the maneuvering controller, to maneuver missile 352 and missile support 356 to the predetermined orientation suitable for launching missile 352.

In stage III, the release mechanism is activated according to an output of the release controller, to decouple missile 352 from missile support 356. Furthermore, the propulsion system (not shown) of missile 352 is activated, thereby launching missile 352 after reaching the predetermined orientation in the atmosphere. The orientation of missile 352 may change, after being decoupled from missile support 356. Hence, the orientation of missile 352 and missile support 356 in stage III, may be selected such that missile 352 is launched at an orientation suitable for launch, after being decoupled from missile support 356.

Alternatively, either one of the maneuvering controller and the positioning controller or both, can be located remote to system 350, such as within missile 352, within flying vehicle 354, within an orbiting satellite (not shown), on the Earth, and the like. In these cases, the positioning controller and the maneuvering controller are coupled with the positioning actuators and the maneuvering actuators, respectively, wirelessly.

Further alternatively, ailerons 360 can be foldable but non-movable relative to missile support 356, after moving to the operational position. In this case, missile support is devoid of the maneuvering actuator and the maneuvering controller, and ailerons 360 together with elevators 358 maneuver missile support 356 while being stationary relative to missile support 356. Alternatively, ailerons 360 can be in the operational position in the zero stage (FIG. 7A, i.e., not being capable to fold and unfold). In this case, system 350 is devoid of the positioning actuators and the positioning controller, since there is no need to move ailerons 360 from the folded position to the operational position. Further alternatively, ailerons 360 can be rigidly fixed to missile support 356 (i.e., not being capable to fold and unfold, and not being able to be moved relative to missile support 356 in any of the stages described herein above). In this case, system 350 is devoid of the positioning actuators, the positioning controller, the maneuvering actuators, and the maneuvering controller.

Instead of elevators 358, the missile support can include only a single elevator (i.e., an exposed control surface—not shown). In this case, the exposed control surface is substantially symmetric about the longitudinal axis of the missile support, such as to aid the maneuvering actuator to maneuver the missile and the missile support to the predetermined orientation. System 350 can further include a first communication interface (not shown) to enable the positioning actuators, maneuvering actuators, and the release mechanism to communicate wirelessly with a remote controller (not shown), as described herein above in connection with FIG. 2A.

Figure 8A:
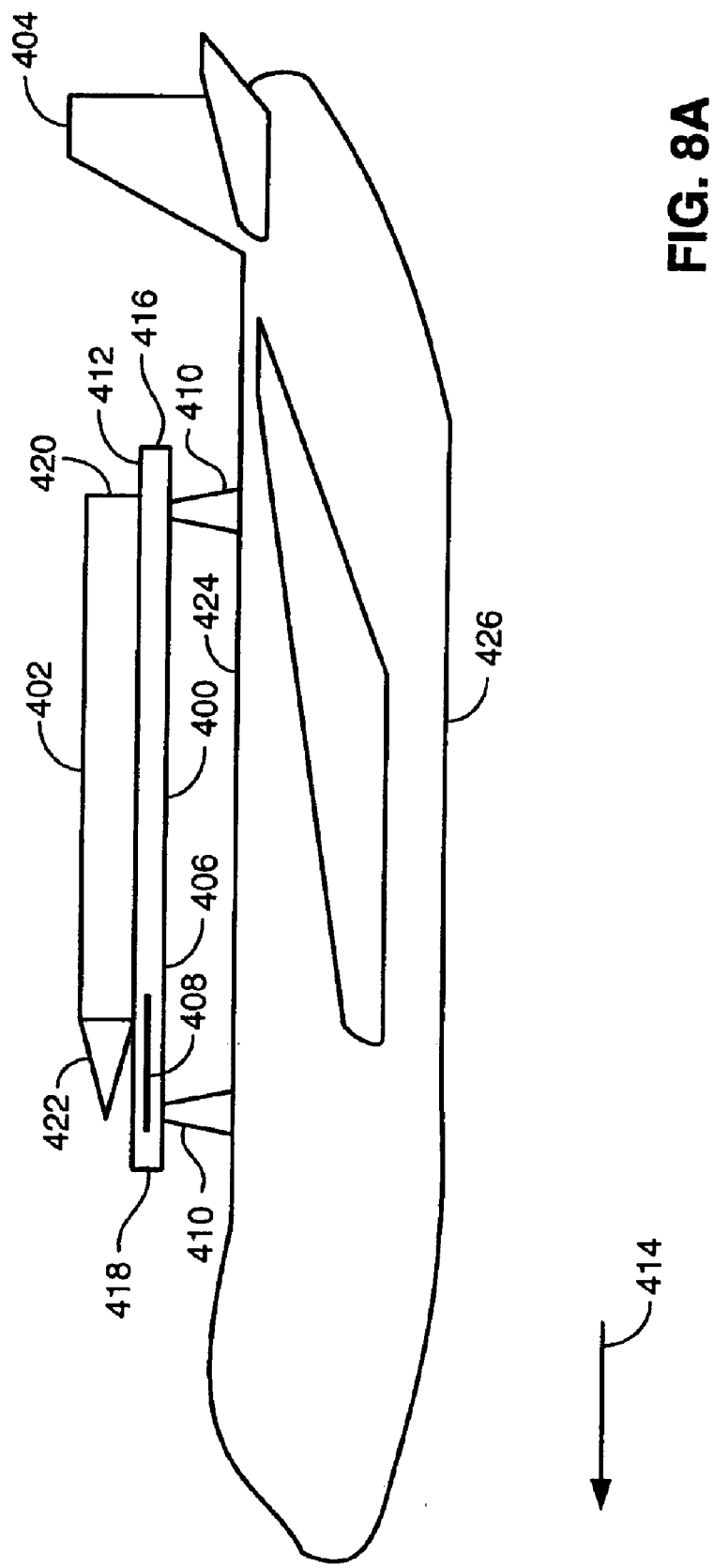
FIG. 8A is a schematic illustration of a system constructed and operative according to a further embodiment of the disclosed technique, for launching a missile, the system and the missile being carried external to a flying vehicle.
Figure 8B:
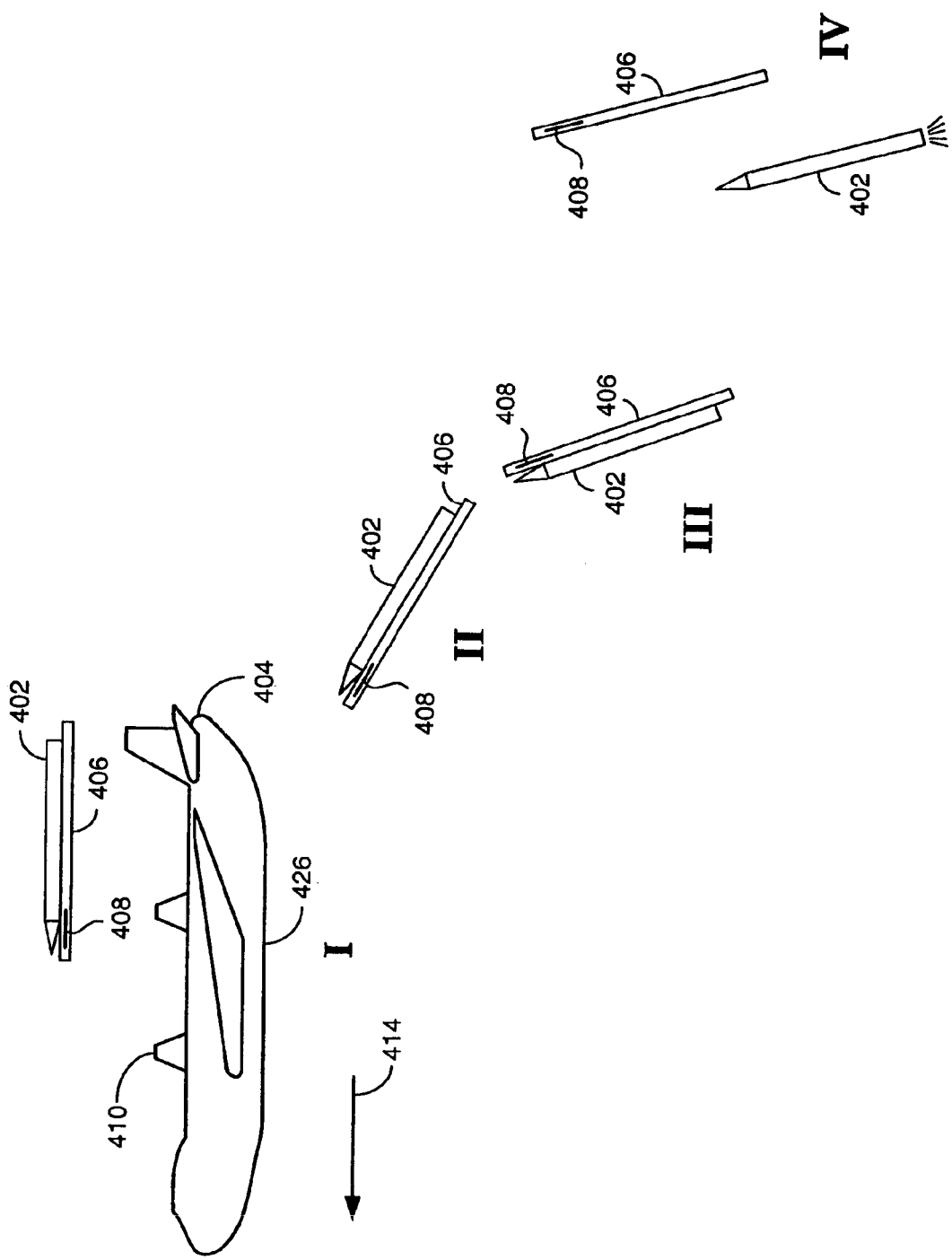
FIG. 8B is a schematic illustration of different stages in launching the missile of FIG. 8A.

Reference is now made to FIGS. 8A and 8B. FIG. 8A is a schematic illustration of a system generally referenced 400, constructed and operative according to a further embodiment of the disclosed technique, for launching a missile generally referenced 402, the system and the missile being carried external to a flying vehicle generally referenced 404. FIG. 8B is a schematic illustration of different stages in launching the missile of FIG. BA.

With reference to FIG. 8A, system 400 includes a missile support 406 and a control-surface mechanism (not shown). The control-surface mechanism includes a pair of canards 408 (i.e., control surfaces), one or more positioning actuators (not shown), a positioning controller (not shown), one or more maneuvering actuators (not shown) and a maneuvering controller (not shown). The positioning actuators are coupled with canards 408 and with the positioning controller. The maneuvering actuators are coupled with canards 408 and with the maneuvering controller. The positioning controller can be a timer, a processor, an orientation detector, and the like. The positioning controller and the maneuvering controller can be incorporated together as a single unit. At the zero stage, canards 408 are in a folded position within missile support 406.

Missile 402 is coupled with missile support 406, and missile support 406 is coupled with an upper portion 424 of a fuselage 426 of flying vehicle 404 by pylons 410. Each of pylons 410 includes a disengagement mechanism (not shown) for decoupling system 400 and missile 402 from pylons 410 and thus from fuselage 426. Missile 402 is coupled with missile support 406 in a similar manner as described herein above in connection with FIG. 7A, except that missile 402 is located on a top surface 412 of missile support 406 prior to decoupling of system 400 from fuselage 426 (i.e., system 400 is located between fuselage 426 and missile 402). Thus, some of the stages in FIG. 8B are similar to those of FIG. 7B.

At zero stage (FIG. 8A), flying vehicle 404 flies in a direction designated by an arrow 414. At this stage, a direction from an aft portion 416 of missile support 406 to a fore portion 418 thereof, is along arrow 414. At this stage, a direction from an aft portion 420 of missile 402 to a fore portion 422 thereof, is along arrow 414.

With reference to FIGS. 8B and 11B, at stage I, the disengagement mechanism is activated, thereby decoupling missile support 406 from fuselage 426. At this stage, the positioning controller controls the positioning actuators to move canards 408 from the folded position to the operational position. Depending on the type of the positioning controller, the positioning actuators move canards 408 at a predetermined time, according to an output of a timer (not shown) or a processor (not shown), or missile 402 and missile support 406 reach a predetermined orientation (according to an output of an orientation detector—not shown).

In stage II, missile support 406 and missile 402 commence a free fall motion. The configuration of missile 402 and missile support 406 in stage II, where missile support 406 is located below missile 402, is mechanically unstable. Thus, missile 402 and missile support 406 have a tendency to move toward a stable condition, and thus roll about a longitudinal axis (not shown) of either missile 402 or missile support 406, thereby reaching the configuration of stage III. Canards 408 can be employed to aid in performing the rolling motion.

Canards 408 apply aerodynamic forces on missile support 406 of such magnitude and direction, to enable missile support 406 and missile 402 to reach a predetermined orientation (stage III) suitable for launching missile 402 toward the predetermined orbit. The maneuvering actuators move canards 408 according to an output from the maneuvering controller, in order to maneuver missile support 406 and missile 402 toward the predetermined orientation.

In stage IV, the release mechanisms are activated according to an output from the release controller, wherein missile support 406 is decoupled from missile 402. At this stage, the propulsion system of missile 402 is activated, thereby launching missile 402 after reaching the predetermined orientation in the atmosphere. It is noted that a system similar to system 350 (FIG. 7A) can include ailerons 360 (FIG. 7A), elevators 358, or canards 408 (FIG. 8A), or a combination thereof, in addition to maneuvering elements similar to maneuvering elements 156 (FIG. 3) and 158, as described herein above.

Figure 9:
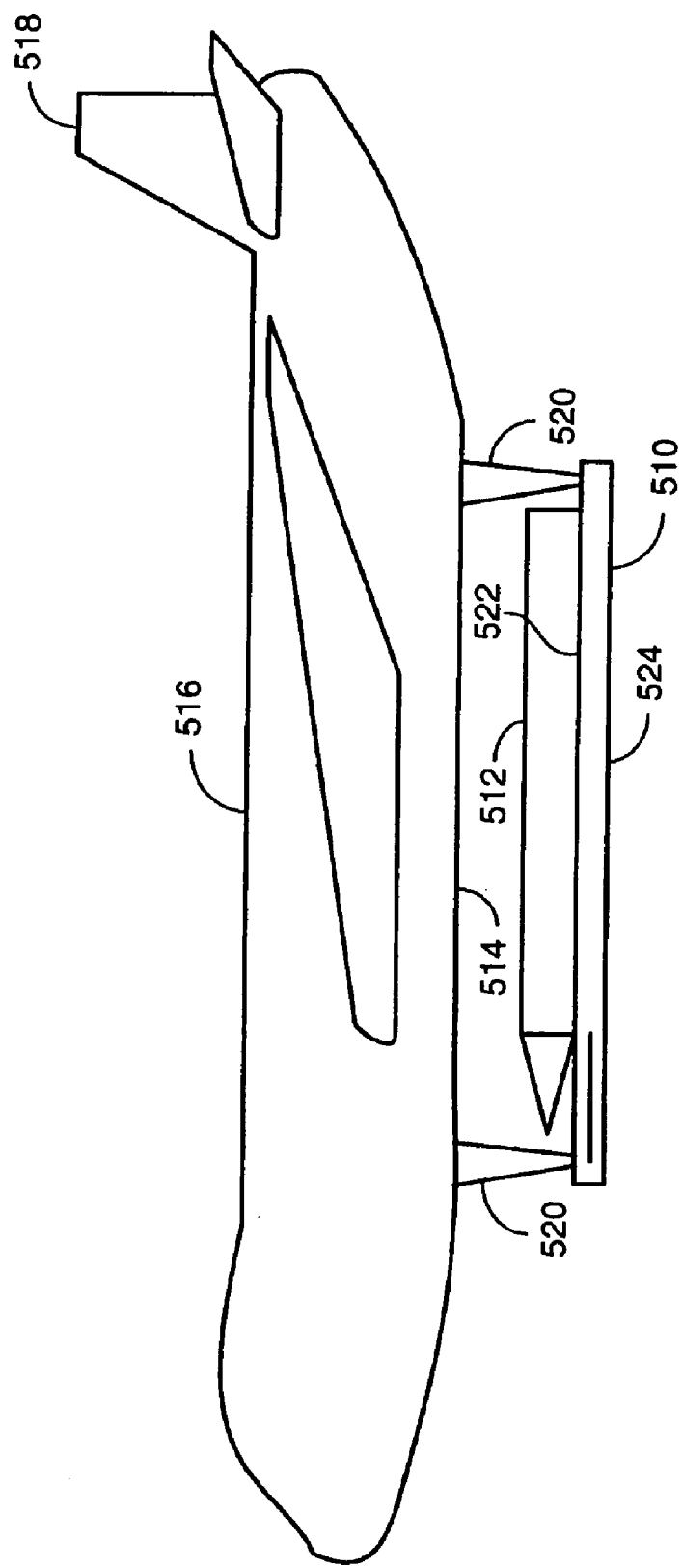
FIG. 9 is a schematic illustration of a system for launching a missile, wherein the missile and the system are coupled with a lower portion of a fuselage of a flying vehicle.

Reference is now made to FIG. 9, which is a schematic illustration of a system generally referenced 510 for launching a missile generally referenced 512, wherein the missile and the system are coupled with a lower portion of a fuselage of a flying vehicle. System 510 is coupled with a lower portion 514 of a fuselage 516 of a flying vehicle 518, by pylons 520. Missile 512 is coupled with a top surface 522 of a missile support 524. Hence, missile 512 is located between missile support 524 and fuselage 516 prior to decoupling of missile support 524 and missile 512 from fuselage 516. In this manner, missile 512 is protected from debris on the runway during takeoff of flying vehicle 518.

According to the example set forth in FIG. 9, missile 512 and missile support 524 pass through a plurality of stages similar to stages II (FIG. 8B), III, and IV, after being decoupled from fuselage 516. In this case, system 510 is similar to system 400 (FIG. 8A) as described herein above. Alternatively, the missile can be coupled to a lower surface of the missile support, such that the missile support is located between the fuselage and the missile. In this case, the missile and the missile support pass through a plurality of stages similar to stages II (FIG. 7B), and III after being decoupled from the fuselage. In this case, the system 510 is similar to system 350 (FIG. 7A) as described herein above.

Figure 10:
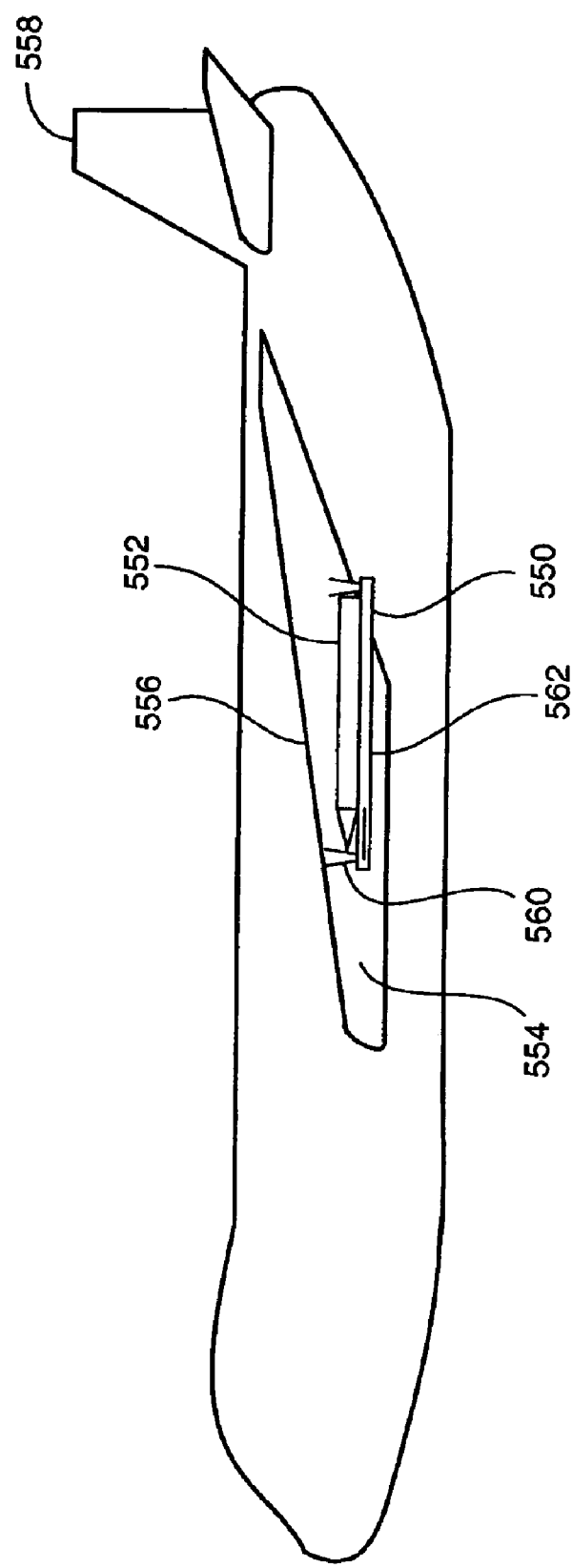
FIG. 10 is a schematic illustration of a system for launching a missile, wherein the missile and the system are coupled with a lower surface of a wing of a flying vehicle.

Reference is now made to FIG. 10, which is a schematic illustration of a system generally referenced 550 for launching a missile generally referenced 552, wherein the missile and the system are coupled with a lower surface of a wing of a flying vehicle. System 550 is coupled with a lower surface 554 of a wing 556 of a flying vehicle 558 by pylons 560. Missile 552 is coupled with an upper surface (not shown) of a missile support 562, such that missile 552 is located between wing 556 and missile support 562, before missile 552 and missile support 562 are decoupled from wing 556.

In the example set forth in FIG. 10, system 550 is similar to system 400 (FIG. 8A), wherein missile 552 and missile support 562 pass through the respective stages as described herein above in connection with FIG. 9. Alternatively, system 550 can be similar to system 350 (FIG. 7A), wherein missile 552 and missile support 562 are arranged accordingly, and pass through the respective stages as described herein above in connection with FIG. 9. Further alternatively, the missile support and the missile can be coupled with an upper surface of the wing of the flying vehicle.

Figure 11:
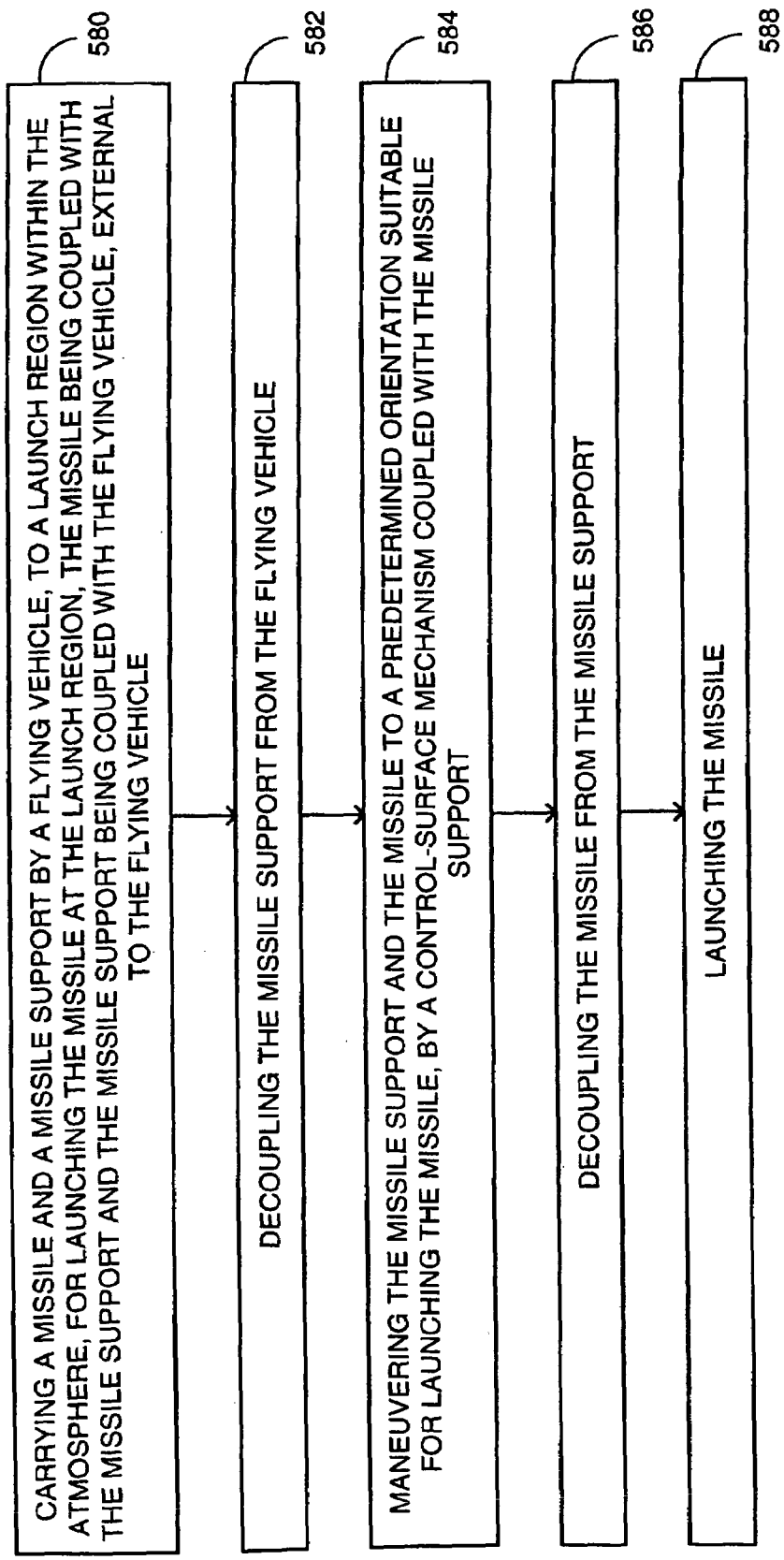
FIG. 11 is a schematic illustration of a method for operating the system of either of FIG. 7A or 8A, operative according to another embodiment of the disclosed technique.

Reference is now made to FIG. 11, which is a schematic illustration of a method for operating the system of either of FIGS. 7A or 8A, operative according to another embodiment of the disclosed technique. In procedure 580, a missile and a missile support are carried by a flying vehicle to a launch region within the atmosphere, for launching the missile at the launch region, the missile being coupled with the missile support and the missile support being coupled with the flying vehicle, external to the flying vehicle.

With reference to FIG. 7A, at the zero stage, missile 352 is coupled with missile support 356 and missile support 356 is coupled with an external portion of flying vehicle 354 (i.e., fuselage 372), while flying vehicle 354 carries missile 352 and missile support 356 to the launch region for launching missile 352.

In procedure 582, the missile support is decoupled from the flying vehicle. With reference to FIG. 7B, in stage I, missile support 356 which supports missile 352, is decoupled from flying vehicle 354 (i.e., fuselage 372), by activating the disengagement mechanism. In procedure 584, the missile support and the missile are maneuvered to a predetermined orientation suitable for launching the missile, by a control-surface mechanism coupled with the missile support. With reference to FIG. 7B, in stage II, the maneuvering controller controls the maneuvering actuator to move elevators 358 and ailerons 360, in order to maneuver missile 352 together with missile support 356, to the predetermined orientation within the atmosphere, suitable for launching missile 352.

In procedure 586, the missile is decoupled from the missile support. With reference to FIG. 7B, in stage III, missile 352 is decoupled from missile support 356 by activating the release mechanism, and missile 352 is launched by activating the propulsion system of missile 352.

It will be appreciated by persons skilled in the art that the disclosed technique is not limited to what has been particularly shown and described hereinabove. Rather the scope of the disclosed technique is defined only by the claims, which follow.

The invention claimed is:

1. System for launching a missile from a launch region within the atmosphere of a planet, the missile being located within a flying vehicle before launching the missile, the system comprising:
   a missile support coupled with said missile; and
   a foldable control-surface mechanism coupled with said missile support, said foldable control-surface mechanism being in a folded position before ejecting said missile support and said missile from said flying vehicle, said foldable control-surface mechanism moving from a folded position to an operational position after ejecting said missile support and said missile from said flying vehicle, said foldable control-surface mechanism maneuvering said missile and said missile support to a predetermined upward orientation suitable for launching said missile,
   a release controller including an orientation detector, the orientation detector being coupled with said missile support to detect when said missile and said missile support reach said predetermined upward orientation; and
   at least one release mechanism coupled with said release controller,
   wherein said at least one releasable mechanism couples said missile with said missile support before said missile and said missile support reach said predetermined upward orientation, and wherein said at least one releasable mechanism decouples said missile from said missile support, according to a signal received from said release controller, after said missile and said missile support reach said predetermined upward orientation, and wherein said missile is launched after decoupling from said missile support.

2. The system according to claim 1, wherein said foldable control-surface mechanism comprises at least two control surfaces.

3. The system according to claim 2, wherein at least one of said at least two control surfaces can be folded within said missile support.

4. The system according to claim 2, wherein at least one of said at least two control surfaces can be folded external to said missile support.

5. The system according to claim 2, wherein at least one of said at least two control surfaces is in form of an airfoil.

6. The system according to claim 2, wherein said foldable control-surface mechanism further comprises: a positioning controller; and at least one positioning actuator coupled with said at least two control surfaces and with said positioning controller, wherein said at least one positioning actuator moves said at least two control surfaces from said folded position to said operational position, according to a signal received from said positioning controller.

7. The system according to claim 6, wherein the type of said at least one positioning actuator is selected from the list consisting of: variable displacement; and constant displacement.

8. The system according to claim 6, wherein the type of said positioning controller is selected from the list consisting of:

timer;

processor; and another orientation detector.

9. The system according to claim 6, wherein said foldable control-surface mechanism further comprises a first communication interface coupled with said positioning controller, wherein said positioning controller communicates wirelessly with a remote controller via said first communication interface and a second communication interface, said second communication interface is coupled with said remote controller, and wherein said at least one positioning actuator moves said at least two control surfaces from said folded position to said operational position, according to a signal received from said remote controller.

10. The system according to claim 2, wherein said foldable control-surface mechanism further comprises: a maneuvering controller; and at least one maneuvering actuator coupled with said at least two control surfaces and with said maneuvering controller, wherein said at least one maneuvering actuator moves said at least two control surfaces according to a signal received from said maneuvering controller, to maneuver said missile and said missile support to said predetermined orientation.

11. The system according to claim 10, wherein the type of said at least one maneuvering actuator is selected from the list consisting of: hydraulic; pneumatic; and electric.

12. The system according to claim 1, wherein the contour of said missile support is selected from the list consisting of: polygon; closed curve; and a combination of at least one line and at least one curve.

13. The system according to claim 1, further comprising at least one ejection parachute coupled with said missile support, wherein said at least one ejection parachute ejects said missile support and said missile from said flying vehicle.

14. The system according to claim 1, further comprising at least one ejection element coupled with said missile support and with said flying vehicle, wherein said at least one ejection element ejects said missile support and said missile from said flying vehicle.

15. The system according to claim 14, wherein the type of said at least one ejection element is selected from the list consisting of: hydraulic; pneumatic; electric; and mechanical.

16. The system according to claim 1, further comprising an exposed control-surface mechanism, said exposed control-surface mechanism comprising at least one exposed control surface, wherein said exposed control-surface mechanism maneuvers said missile and said missile support.

17. The system according to claim 16, wherein said exposed control-surface mechanism is selected from the list consisting of: movable; and stationary.

18. Method for launching a missile from a launch region within the atmosphere of a planet, the missile being located within a flying vehicle before launching the missile, the method comprising the procedures of:

ejecting said missile and a missile support from inside of said flying vehicle, said missile being coupled with said missile support;

moving a control-surface mechanism from a folded position to an operational position, said control-surface mechanism being coupled with said missile support;

rolling said missile support about a longitudinal axis of said missile support;

maneuvering said missile support and said missile, by said control-surface mechanism, to a predetermined upward orientation suitable for launching said missile;

detecting when said missile and said missile support reach said predetermined upward orientation;

decoupling said missile from said missile support after said missile and said missile support reach said predetermined upward orientation; and activating the propulsion system of said missile to launch said missile.

19. The method according to claim 18, further comprising a preliminary procedure of carrying said missile and said missile support by said flying vehicle, to said launch region for launching said missile at said launch region.

20. The method according to claim 18, further comprising a procedure of activating at least one ejection parachute, before performing said procedure of ejecting, said at least one ejection parachute being coupled with said missile support.

21. The method according to claim 18, further comprising a procedure of activating at least one ejection element, before performing said procedure of ejecting, said at least one ejection element being coupled with said missile support and with said flying vehicle.

22. The method according to claim 18, further comprising a procedure of uncoupling at least one ejection parachute from said missile support, after performing said procedure of ejection.

23. The method according to claim 18, wherein said ejection procedure is performed while a missile direction from an aft section of said missile to a fore section of said missile, is substantially along a flying direction of said flying vehicle.

24. The method according to claim 18, wherein said ejection procedure is performed while a missile direction from an aft section of said missile to a fore section of said missile, is substantially opposite a flying direction of said flying vehicle.

25. The method according to claim 18, wherein said moving procedure is performed according to a signal received from a positioning controller.

26. The method according to claim 18, wherein said rolling procedure is performed by a foldable control-surface mechanism.

27. The method according to claim 18, wherein said rolling procedure is performed by an exposed control-surface mechanism.

28. The method according to claim 18, wherein said rolling procedure is performed by at least two maneuvering elements.

29. The method according to claim 18, wherein said maneuvering procedure is performed according to a signal received from a maneuvering controller.

30. The method according to claim 18, wherein said maneuvering procedure is performed while said control-surface mechanism is stationary relative to said missile support.

31. The method according to claim 18, wherein said maneuvering procedure is performed while said control-surface mechanism is moving relative to said missile support.

32. System for launching a missile from a launch region within the atmosphere of a planet, the missile being carried to the launch region by a flying vehicle while the missile is coupled externally with the flying vehicle, the system comprising:
   a missile support coupled with said missile and with said flying vehicle, said missile support and said missile being located outside of said flying vehicle, said missile support being decoupled from said flying vehicle when said flying vehicle is at said launch region; and
   a control-surface mechanism coupled with said missile support, said control-surface mechanism maneuvering said missile and said missile support to a predetermined upward orientation suitable for launching said missile,
   a release controller including an orientation detector, the orientation detector being coupled with said missile support to detect when said missile and said missile support reach said predetermined upward orientation; and
   at least one release mechanism coupled with said release controller,
   wherein said at least one releasable mechanism couples said missile with said missile support before said missile and said missile support reach said predetermined upward orientation, and
   wherein said at least one releasable mechanism decouples said missile from said missile support, according to a signal received from said release controller, after said missile and said missile support reach said predetermined upward orientation, and
   wherein said missile is launched after decoupling from said missile support.

33. The system according to claim 32, wherein said missile is located between said missile support and a fuselage of said flying vehicle.

34. The system according to claim 32, wherein said missile support is located between said missile and a fuselage of said flying vehicle.

35. The system according to claim 32, wherein said missile support is coupled with an upper portion of a fuselage of said flying vehicle.

36. The system according to claim 32, wherein said missile support is coupled with a lower portion of a fuselage of said flying vehicle.

37. The system according to claim 32, wherein said missile support is coupled with a wing of said flying vehicle.

38. The system according to claim 32, wherein said control-surface mechanism comprises at least two control surfaces.

39. The system according to claim 38, wherein said at least two control surfaces can be folded within said missile support.

40. The system according to claim 38, wherein said at least two control surfaces can be folded external to said missile support.

41. The system according to claim 38, wherein said at least two control surfaces are in a folded position before decoupling said missile support from said flying vehicle, and wherein said at least two control surfaces move from said folded position to an operational position, when said missile support is no longer coupled with said flying vehicle.

42. The system according to claim 38, wherein at least one of said at least two control surfaces are in an operational position, both before and after decoupling said missile support from said flying vehicle.

43. The system according to claim 38, wherein at least one of said at least two control surfaces are coupled with said missile support, at a location relative to a direction of flight of said flying vehicle, said location being selected from the list consisting of: aft; fore; and middle.

44. The system according to claim 38, wherein at least one of said at least two control surfaces are in form of an airfoil.

45. The system according to claim 38, wherein at least one of said at least two control surfaces are in form of a substantially flat plate.

46. The system according to claim 38, wherein at least one of said at least two control surfaces are selected from the list consisting of: movable; and stationary.

47. The system according to claim 38, wherein said control-surface mechanism further comprises: a positioning controller; and at least one positioning actuator coupled with said at least two control surfaces and with said positioning controller, and wherein said at least one positioning actuator moves said at least two control surfaces from a folded position to an operational position, according to a signal received from said positioning controller.

48. The system according to claim 47, wherein the type of said at least one positioning actuator is selected from the list consisting of: variable displacement; and constant displacement.

49. The system according to claim 47, wherein the type of said positioning controller is selected from the list consisting of:
   timer;
   processor; and
   another orientation detector.

50. The system according to claim 47, wherein said control-surface mechanism further comprises a first communication interface coupled with said positioning controller, wherein said positioning controller communicates wirelessly with a remote controller via said first communication interface and a second communication interface, said second communication interface is coupled with said remote controller, and wherein said at least one positioning actuator moves said at least two control surfaces from said folded position to said operational position, according to a signal received from said remote controller.

51. The system according to claim 38, wherein said control-surface mechanism further comprises: a maneuvering controller; and at least one maneuvering actuator coupled with at least one of said at least two control surfaces and with said maneuvering controller, and wherein said at least one maneuvering actuator moves at least one of said at least two control surfaces according to a signal received from said maneuvering controller, to maneuver said missile and said missile support to said predetermined orientation.

52. The system according to claim 51, wherein the type of said at least one maneuvering actuator is selected from the list consisting of: hydraulic; pneumatic; and electric.

53. The system according to claim 32, wherein the contour of said missile support is selected from the list consisting of: polygon; closed curve; and a combination of at least one line and at least one curve.

54. The system according to claim 32, further comprising a disengagement mechanism, wherein said disengagement mechanism couples said missile support with said flying vehicle, when said flying vehicle is flying toward said launch region, and wherein said disengagement mechanism decouples said missile support from said flying vehicle, when said flying vehicle is at said launch region.

55. The system according to claim 54, wherein the type of said disengagement mechanism is selected from the list consisting of: hydraulic; pneumatic; pyrotechnic; electric; and mechanical.

56. Method for launching a missile from a launch region within the atmosphere of a planet, the missile being carried to the launch region by a flying vehicle while the missile is coupled externally with the flying vehicle, the method comprising the procedures of:
  decoupling a missile support from said flying vehicle, said missile support coupling said missile with said flying vehicle, while said flying vehicle is flying toward said launch region;
  maneuvering said missile support and said missile, by a control-surface mechanism coupled with said missile support, to a predetermined upward orientation suitable for launching said missile;
  detecting when said missile and said missile support reach said predetermined upward orientation;
  decoupling said missile from said missile support after said missile and said missile support reach said predetermined upward orientation; and
  activating the propulsion system of said missile to launch said missile.

57. The method according to claim 56, further comprising a preliminary procedure of carrying said missile and said missile support by said flying vehicle, to said launch region for launching said missile at said launch region.

58. The method according to claim 56, further comprising a preliminary procedure of coupling said missile support with said flying vehicle, such that said missile is located between said missile support and a fuselage of said flying vehicle.

59. The method according to claim 56, further comprising a preliminary procedure of coupling said missile support with said flying vehicle, such that said missile support is located between said missile and a fuselage of said flying vehicle.

60. The method according to claim 59, further comprising a procedure of rolling said missile support about a longitudinal axis of said missile support, before performing said procedure of maneuvering.

61. The method according to claim 60, wherein said rolling procedure is performed by a control-surface mechanism coupled with said missile support.

62. The method according to claim 60, wherein said rolling procedure is performed by at least two maneuvering elements coupled with said missile support.

63. The method according to claim 62, wherein said at least two maneuvering elements are selected from the list consisting of: micro-rocket motor; thruster; and pressurized-gas operated system.

64. The method according to claim 56, further comprising a preliminary procedure of coupling said missile support with an upper portion of a fuselage of said flying vehicle.

65. The method according to claim 56, further comprising a preliminary procedure of coupling said missile support with a lower portion of a fuselage of said flying vehicle.

66. The method according to claim 56, further comprising a preliminary procedure of coupling said missile support with a wing of said flying vehicle.

67. The method according to claim 56, further comprising a procedure of moving a control-surface mechanism from a folded position to an operational position, before performing said procedure of maneuvering, said control-surface mechanism being coupled with said missile support.

68. The method according to claim 56, further comprising a preliminary procedure of folding a control-surface mechanism within said missile support, said control-surface mechanism being coupled with said missile support.

69. The method according to claim 56, further comprising a preliminary procedure of folding a control-surface mechanism external to said missile support, said control-surface mechanism being coupled with said missile support.

70. The method according to claim 56, wherein said maneuvering procedure is performed while a control-surface mechanism is stationary relative to said missile support, said control-surface mechanism being coupled with said missile support.

71. The method according to claim 56, wherein said maneuvering procedure is performed while a control-surface mechanism is moving relative to said missile support, said control-surface mechanism being coupled with said missile support.

* * * * *